(12) United States Patent
Rooney et al.

(10) Patent No.: US 9,894,849 B2
(45) Date of Patent: Feb. 20, 2018

(54) PRESCRIBING A DRIP LINE FOR USE IN A FIELD

(71) Applicant: Trimble Inc., Sunnyvale, CA (US)

(72) Inventors: Daniel James Rooney, Lake Oswego, OR (US); David Fitzpatrick, Denver, CO (US); Robert Wample, Clovis, CA (US)

(73) Assignee: Trimble Inc., Sunnyvale, CA (US)

( * ) Notice: Subject to any disclaimer, the term of this patent is extended or adjusted under 35 U.S.C. 154(b) by 480 days.

(21) Appl. No.: 14/597,954

(22) Filed: Jan. 15, 2015

(65) Prior Publication Data

US 2016/0205877 A1   Jul. 21, 2016

(51) Int. Cl.
*A01G 25/02*   (2006.01)
*A01G 25/16*   (2006.01)

(52) U.S. Cl.
CPC ............. *A01G 25/02* (2013.01); *A01G 25/16* (2013.01); *A01G 25/167* (2013.01)

(58) Field of Classification Search
None
See application file for complete search history.

(56) References Cited

U.S. PATENT DOCUMENTS

| | | | |
|---|---|---|---|
| 8,412,419 B1 * | 4/2013 | Seamon | A01B 79/005 700/283 |
| 2009/0277506 A1 * | 11/2009 | Bradbury | A01G 25/16 137/1 |
| 2014/0365084 A1 * | 12/2014 | Chan | G01S 13/89 701/50 |
| 2015/0272017 A1 * | 10/2015 | Hedley | G05B 15/02 700/284 |

OTHER PUBLICATIONS

Eutaw, C., "The Biggest Revolution Since Louis XVI Was Beheaded;" Feb. 27, 2014; Christopher Eutaw, Technology; Capitol Hill Daily The Prescriptive Planting Revolution; http://www.capitolhilldaily.com/2014/02/prescriptive-planting/print/; downloaded Mar. 3, 2014, 2 pages.

* cited by examiner

*Primary Examiner* — Paul Yanchus, III
(74) *Attorney, Agent, or Firm* — Kilpatrick Townsend & Stockton LLP

(57) ABSTRACT

Prescribing a drip line for use in a field includes: accessing soil conditions data that includes vertical transect data relating to at least one vertical transect of soil in a field; based on a plant type and a length of time between a first watering and a second watering of a plant via the drip line, determining, a desired plant available water content of a portion of the soil within the at least one vertical transect to be substantially achieved as a result of the first watering; and based on the vertical transect data, the determined desired plant available water content, climate conditions data and geographical conditions data, determining perforation spacing and flow rate for a set of emitters for the drip line such that the desired plant available water is substantially achieved in the portion of the soil.

20 Claims, 11 Drawing Sheets

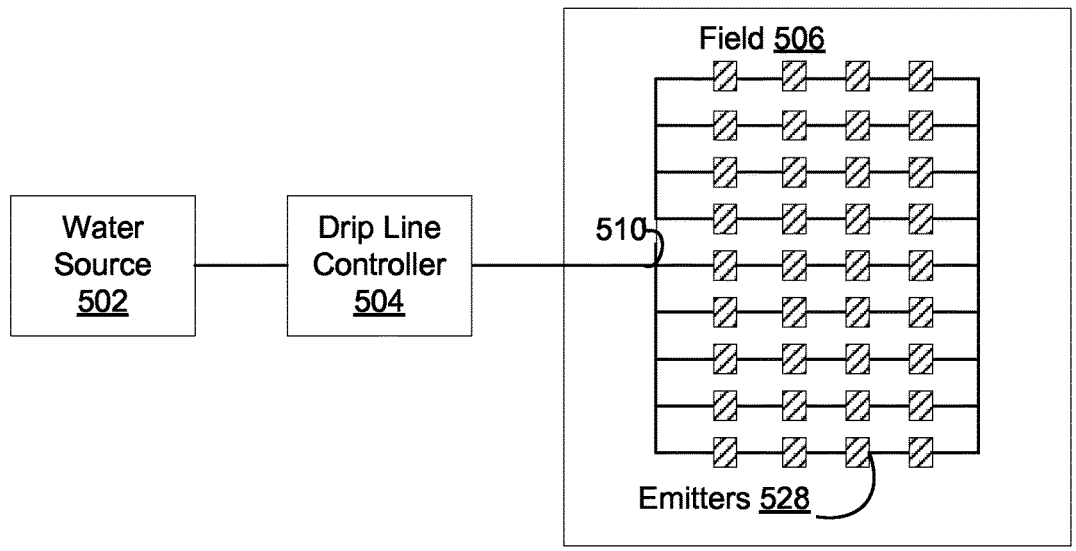
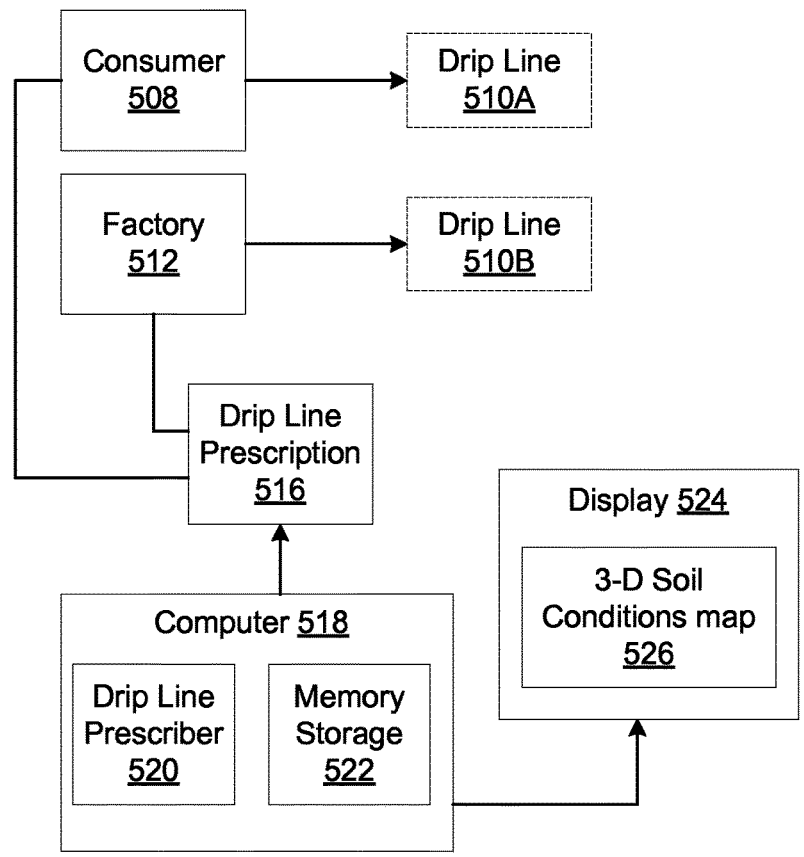
FIG. 5

1000

```
┌─────────────────────────────────────────────────────────────┐
│ ACCESS, BY A COMPUTER, SOIL CONDITIONS DATA FOR SOIL IN A   │
│ FIELD, WHEREIN THE SOIL CONDITIONS DATA INCLUDES VERTICAL   │
│ TRANSECT DATA RELATING TO AT LEAST ONE VERTICAL TRANSECT    │
│ OF THE SOIL                                                 │
│                          1002                               │
└─────────────────────────────────────────────────────────────┘
                              ↓
┌─────────────────────────────────────────────────────────────┐
│ BASED ON A PLANT TYPE OF AT LEAST ONE PLANT FOR PLANTING IN │
│ THE FIELD AND A LENGTH OF TIME BETWEEN A FIRST WATERING AND │
│ A SECOND WATERING OF THE AT LEAST ONE PLANT VIA A DRIP      │
│ LINE, DETERMINE, BY THE COMPUTER, A DESIRED PLANT AVAILABLE │
│ WATER CONTENT OF A PORTION OF THE SOIL WITHIN THE AT LEAST  │
│ ONE VERTICAL TRANSECT TO BE SUBSTANTIALLY ACHIEVED AS A     │
│ RESULT OF THE FIRST WATERING                                │
│                          1004                               │
└─────────────────────────────────────────────────────────────┘
                              ↓
┌─────────────────────────────────────────────────────────────┐
│ BASED ON THE VERTICAL TRANSECT DATA, THE DESIRED PLANT      │
│ AVAILABLE WATER CONTENT, CLIMATE CONDITIONS DATA AND        │
│ GEOGRAPHICAL CONDITIONS DATA, DETERMINE, BY THE COMPUTER,   │
│ PERFORATION SPACING AND FLOW RATE FOR A SET OF EMITTERS FOR │
│ THE DRIP LINE THAT WILL SUPPLY WATER DURING THE FIRST       │
│ WATERING SUCH THAT, ALONG THE DRIP LINE, THE DESIRED PLANT  │
│ AVAILABLE WATER CONTENT IS SUBSTANTIALLY ACHIEVED IN THE    │
│ PORTION OF THE SOIL                                         │
│                          1006                               │
└─────────────────────────────────────────────────────────────┘
                              ↓
┌─────────────────────────────────────────────────────────────┐
│ GENERATE, BY THE COMPUTER, DRIP LINE PRESCRIPTION           │
│ INSTRUCTIONS, WHEREIN THE DRIP LINE PRESCRIPTION            │
│ INSTRUCTIONS ARE CONFIGURED FOR PROVIDING INSTRUCTIONS TO A │
│ USER FOR PLACEMENT OF AN EMITTER OF THE SET OF EMITTERS     │
│ WITH THE FLOW RATE AT A LOCATION ON THE DRIP LINE IN        │
│ ACCORDANCE WITH DETERMINED PERFORATION SPACING              │
│                          1008                               │
└─────────────────────────────────────────────────────────────┘
                              ↓
┌─────────────────────────────────────────────────────────────┐
│ PRESENT, BY THE COMPUTER, THE DRIP LINE PRESCRIPTION        │
│ INSTRUCTIONS SUCH THAT THE DRIP LINE PRESCRIPTION           │
│ INSTRUCTIONS ARE ENABLED TO BE VISUALLY DISPLAYED           │
│                          1010                               │
└─────────────────────────────────────────────────────────────┘
```

FIG. 10

PRESCRIBING A DRIP LINE FOR USE IN A FIELD

BACKGROUND ART

Drip irrigation is the controlled delivery of water directly to individual plants through a network of tubes or pipes. When properly designed and managed, drip irrigation has many advantages over other irrigation methods. These advantages include: the elimination of surface runoff; a high uniformity of water distribution; a high water usage efficiency; a flexibility in fertilization; and a prevention of weed growth and plant disease. Drip systems are also easily integrated into fertigation systems and automated systems. However, even though drip systems enable a relatively uniform water distribution to individual plants, depending upon various factors, such as soil conditions, plant types, and weather, drip systems do not always provide the amount of water needed for optimal individual plant growth.

BRIEF DESCRIPTION OF THE DRAWINGS

The accompanying drawings, which are incorporated in and form a part of this specification, illustrate embodiments of the present technology and, together with the description, serve to explain the principles of the present technology. The drawings referred to in this description should not be understood as being drawn to scale except if specifically noted.

FIGS. 5 and 6 are block diagrams, showing a high level view of a drip line prescriber implemented via a computer and functioning to provide a drip line prescription, in accordance with an embodiment.

FIG. 10 is a flow diagram for a method for prescribing a drip line for use in a field, in accordance with an embodiment.

SUMMARY OF EMBODIMENTS

Figure 1:
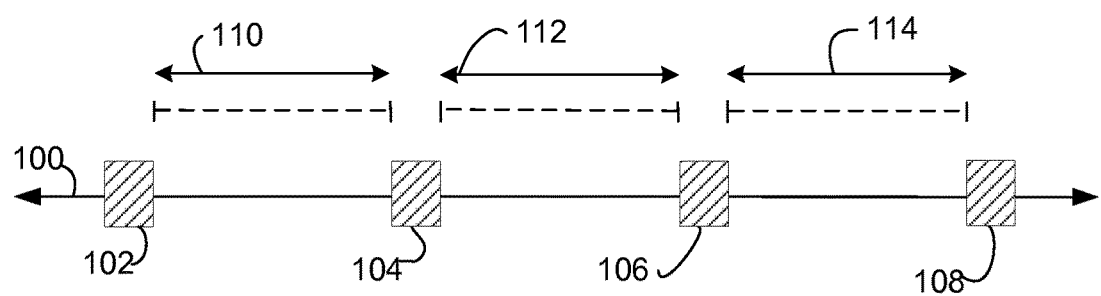
FIG. 1 shows a drip line having emitters placed thereon at uniform spacing relative to each other, in accordance with conventional techniques.

Embodiments provide a method and system for prescribing a customized drip line for use in a field, which may be different from adjacent prescribed drip lines. In embodiments, soil conditions data for soil in a field is accessed, wherein the soil conditions data includes at least one vertical transect of the soil. A vertical transect may include one or more types and layers of soil.

Of note and as will be further described herein, the language, "total water content", refers to that water that is being held by the soil. A portion of the total water content is available to the plant, as "plant available water content".

After the soil conditions data is accessed, the plant type of at least one plant that is or will be planted in the field is determined. Additionally, the length of time between a first watering and a second watering of the at least one plant via the drip line is determined. Then, based on the determined plant type and the determined length of time between the first watering and the second watering, the plant available water content (within the vertical transect) that is needed by the plant is determined, based on the plant type and the length of time between waterings. Of note, according to embodiments, this determined plant available water content that is needed by the plant is delivered by the drip line and through the emitters by the completion time of the first watering.

Then, based on the at least one vertical transect of the soil conditions data, the determination of the desired plant available water content, climate conditions of the field and geographical conditions of the field, a drip line prescription is determined. The drip line prescription details the perforation spacing and the flow rate for a set of emitters for the drip line that will supply water as a result of the first watering such that, along the drip line, the desired plant available water content is substantially achieved in the portion of the soil.

Thus, in one embodiment, information from a vertical transect of soil within a field for planting is used in combination with data relating to the climate and geographic conditions associated with the field, the plants to be planted in the field, and watering information, to determine the type and placement of emitters on a drip line that efficiently enable the plants planted in the field to grow at a desired rate, while preserving resources. The specific emitters selected and the determined spacing of these emitters occurs according to a unique drip line prescription for the location of each emitter. Thus, rather than a group of emitters being determined according to a particular zone (i.e., determined area) within a field, embodiments create a unique prescription for each location at which an emitter is placed, to create the drip line prescription described herein.

DESCRIPTIONS OF EMBODIMENTS

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Unless specifically stated otherwise as apparent from the following discussions, it is appreciated that throughout the present description of embodiments, discussions utilizing terms such as "accessing", "determining", "comparing", "calculating", "generating", "presenting", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices.

Overview of Discussion

Figure 7:
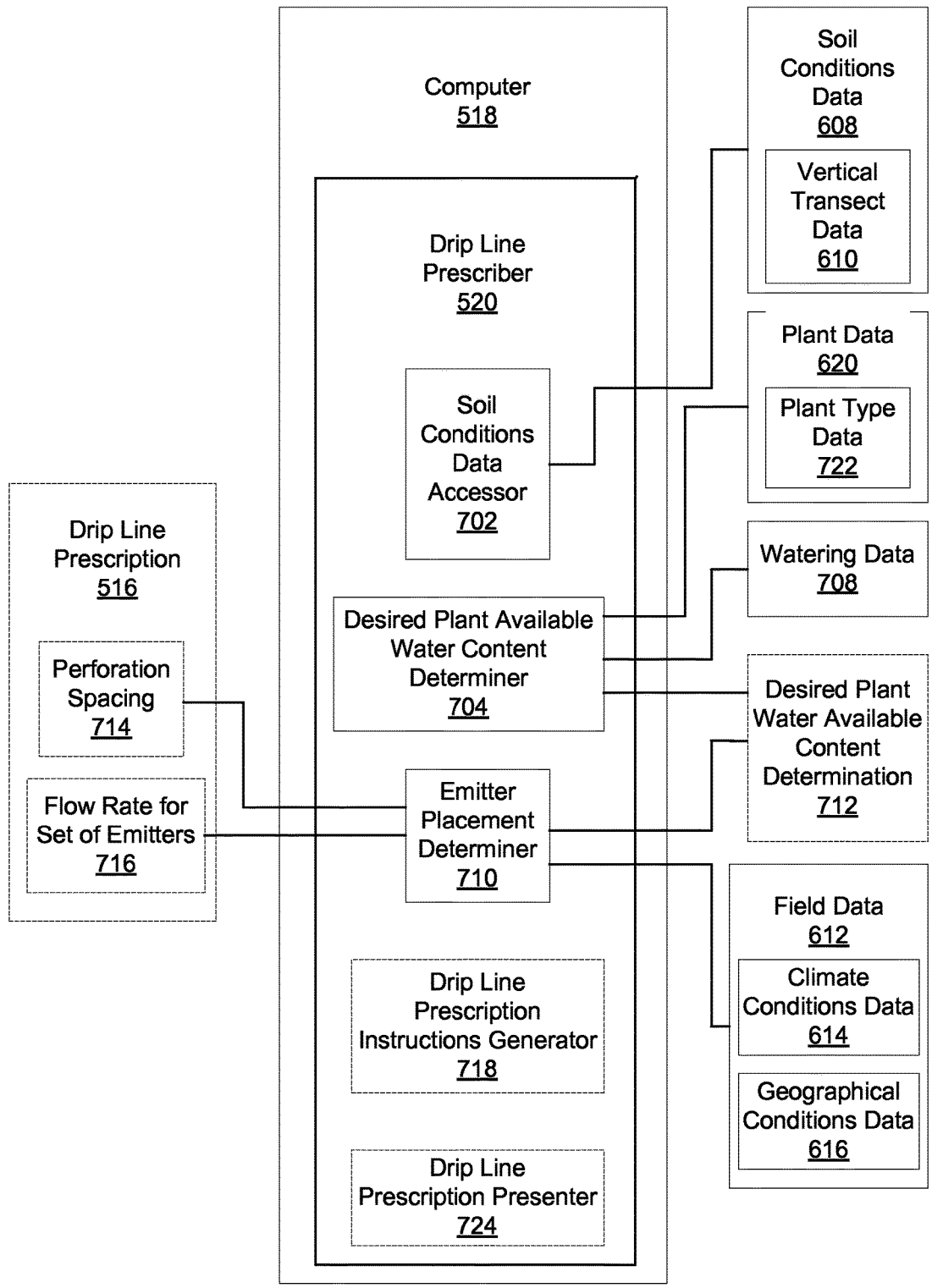
FIG. 7 is a block diagram showing a drip line prescriber, in accordance with an embodiment.
Figure 8:
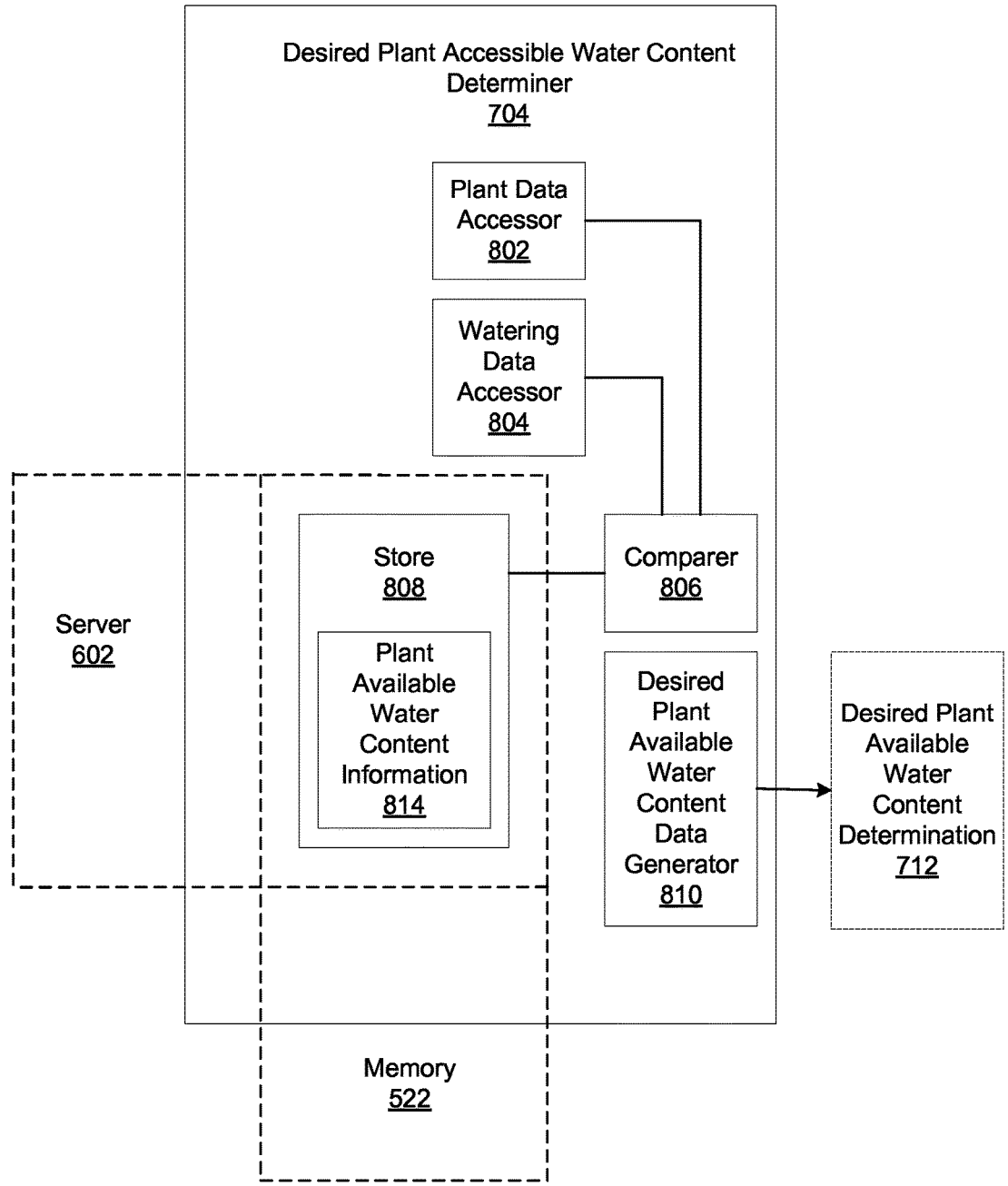
FIG. 8 is a block diagram showing a desired plant available water content determiner, in accordance with an embodiment.
Figure 9:
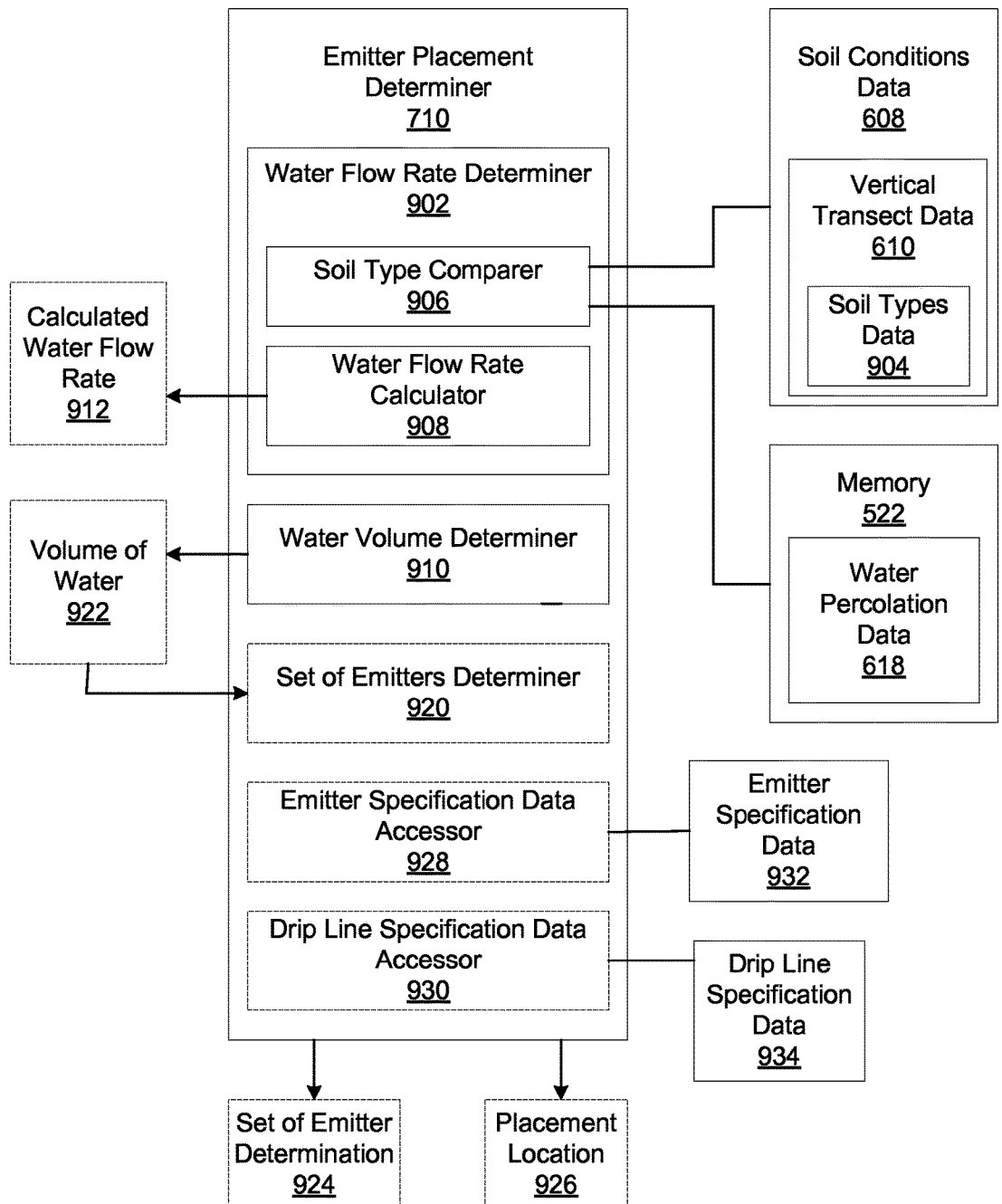
FIG. 9 is a block diagram showing an emitter placement determiner, in accordance with an embodiment.
Figure 11:
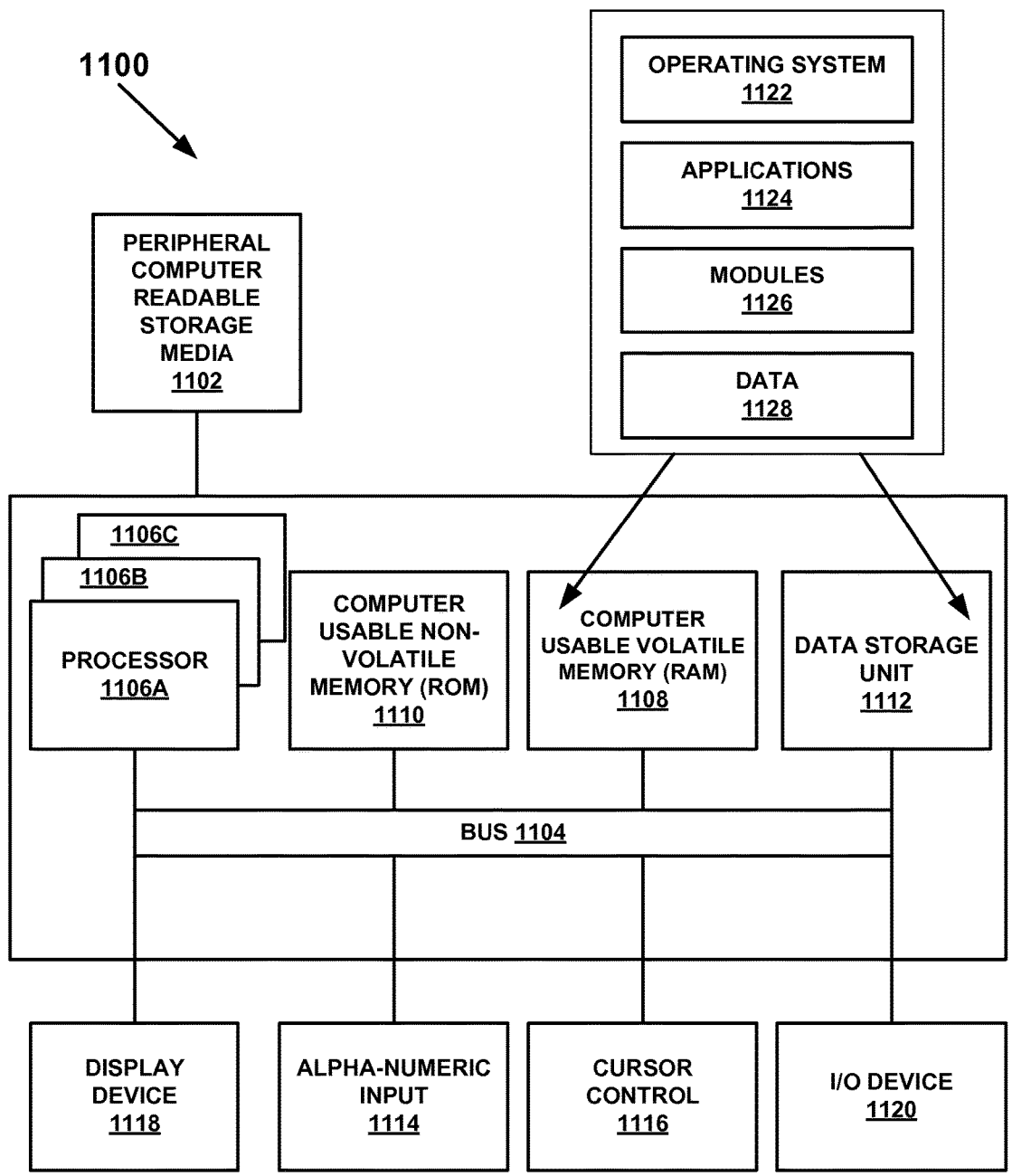
FIG. 11 is a block diagram of an example computer system with which or upon which various embodiments of the present technology may be implemented.

The discussion begins with a brief introduction to drip irrigation, including a description of emitters. The discussion continues with a description of a conventional drip irrigation system and operation thereof is given. Next and with reference to FIGS. 1-4, the discussion continues with a more detailed overview of a description of embodiments. For example, with reference to FIGS. 5 and 6, a high level description of an overall system is discussed, in accordance with embodiments. With reference to FIG. 7, a drip line prescriber is discussed, in its most basic terms, in accordance with embodiments. With reference to FIGS. 8 and 9, the discussion continues with a description of components of the drip line prescriber, in accordance with embodiments. FIG. 10 illustrates a method for prescribing a drip line for use in a field, in accordance with embodiments. FIG. 11 describes an example computer system on which systems and methods operate, in accordance with embodiments.

Drip Irrigation and Emitters

Drip irrigation is the controlled delivery of water directly to individual plants through a network of tubes or pipes. When properly designed and managed, drip irrigation has many advantages over other irrigation methods. These advantages include: the elimination of surface runoff; a high uniformity of water distribution; a high water usage efficiency; a flexibility in fertilization; and a prevention of weed growth and plant disease. Drip systems are also easily integrated into fertigation systems and automated systems. However, even though drip systems enable a relatively uniform water distribution to individual plants, depending upon various factors, such as soil conditions, plant types, and weather, drip systems do not always provide the amount of water needed for optimal individual plant growth.

Before drip irrigation techniques existed, irrigation water was applied to an entire field, whether by sprinklers or by flood irrigation, resulting in a significant loss of water. Drip irrigation is a modern irrigation method in which water is delivered directly into the root zone of the plant. Drip irrigation typically uses low pressure and low flow rates of water that is applied only to specific zones in the field, where plants are grown.

During "drip" irrigation, water is applied through holes in the tube or pipe. (Hereinafter, for purposes of brevity, the term, "tube", will be used for the language, "tube or pipe", unless specifically noted otherwise.) Of note, a tube with holes therein is commonly called a "drip tape". The emitters are installed on the tube and act as small throttles, ensuring that a uniform rate of flow is emitted. Some are bunt into the tube, while others are attached to tube. The emitter functions partly to reduce and regulate the amount of water discharged. Emitters are classified into groups based on its design type and its method(s) used to regulate pressure. In conventional drip irrigation tubing, emitters are pre-installed at the factory and have a specific spacing pattern and flow rate. The emitter is used to transfer water from the tubing to the area that is to be irrigated. Typical emitter flow rates are from 0.16 to 4.0 gallons/hour. In many emitters, the flow rate will vary with pressure, while some emitters are pressure compensating.

While all emitters provide pressure compensation to some degree, the pressure compensating emitter is especially designed to discharge water at a very uniform flow rate over a range of pressures, for example from 10 to 50 psi (70 to 350 kPa). The most common flow rates for which emitters are manufactured are: 2.0 liters/hour (½ gallon/hour); 4.0 liters/hour (1 gallon/hour); and 8.0 liters/hour (2 gallons/hour). Types of emitters may be any, but are not limited to being, the following, as known in the art of drip irrigation: long-path emitters; soaker hose, porous pipe, drip tape and laser tubing; short-path emitters; tortuous-path or turbulent-flow emitters; vortex emitters; diaphragm emitters; adjustable flow emitters; and mechanical emitters. Some of the more notable manufacturers of emitters are: Chapin Watermatics™ (NY, U.S.A.); DRTS™ (USA, Italy, Turkey); Eurodrip™ (CA, U.S.A.); Jain Irrigation Systems™ (Jalgaon, India); Netafim Irrigation™ (CA, U.S.A.); and Toro Micro-Irrigation™ (MN, U.S.A.).

A drip line is a drip tube with factory preinstalled emitters disposed in it. Often, the emitters are molded inside the tube, and all that is visible on the outside is a hole for the water to come out.

Conventional Drip Irrigation System

Conventional drip irrigation systems and methods determine the type, spacing and location of emitters along a drip line based a single soil type within a large area of land encompassing the field to be watered, the climate, the expected weather, the plants' expected exposure to the elements and the plants' expected response to transpiration needs. Additionally, conventional drip irrigation systems are dependent on conventional soil mapping techniques for determining the soil type for different plant regions. Conventional soil mapping techniques involve a description of a large area of land (e.g., the Santa Rosa Plain) having a particular soil type, and typically, an emitter spacing and type that do not vary within a field.

Following is a discussion of a conventional method for determining a watering schedule (how much and when to water plants) for an automatic controller-driven drip irrigation system that has been applied in Sonoma County, California. Such description is introduced to, in part, describe terminology and considerations that have some relationship to embodiments of the present technology.

In this conventional method for determining a watering schedule for a drip irrigation system, at least the following three steps were taken and are described below: Step (1) determine the water requirement per day or month for a planting area; Step (2) determine how many emitters to use and/or how much tube to use; and Step (3) determine the watering days and times necessary for desired plant growth and sustainability.

The conventional method found that the amount of water needed (relating to the foregoing three steps) by any given planting zone is influenced by at least the following factors: a) the planting zone's soil type; b) the planting zone's exposure to the elements; and c) the plants' response to transpiration demand (i.e., the plants' need for water).

With regard to the "soil type" in which the plants are planted, soils vary greatly in their rate of percolation. For example, sandy soil percolates quickly, loamy soil experiences moderate percolation, and clay soil percolates slowly. Additionally, the denser the soil, the more that the fluid (e.g., water) spreads laterally as it percolates. Therefore, the soil type (which is to be irrigated) also affects the desired or optimal spacing of the emitters along the drip line. For example, in sandy soil, the emitters may be placed closer together. Whereas, in clay soil, the emitters may be placed farther apart. Further, the soil type also influences the watering frequency of the plants, as will be explained below.

With regard to the "exposure to the elements" of the plants within the planting zone, at least the following climate conditions may affect the amount of water needed: location; exposure; wind; and weather. For example, a plant anchored in a sunny, south facing windy hillside will lose more water than the same plant anchored in a shady, sheltered area.

With regard to the "plants' response to transpiration demand", a conventional technique sorts plants into groups consisting of the following groups: no supplemental water needed; drought tolerant; low water needed; moderate water needed; and regular water needed. Further, plants have evapotranspiration ("ET") rates (a.k.a., "plant water use")—the combined water lost from both transpiration from plant leaves and evaporation from the soil and the wet leaves.

Conventional Step (1) Determine the water requirement per day or month for a planting area using a single soil type:

A term known as Reference ET has been calculated for all locations in California for every month of the year—this is abbreviated as ET° and is the amount of water needed by the reference plant to survive. In this example, the reference plant is a tall fescue grass, which is a thirsty plant, and requires regular water. ET regions are numbered 1-18, in this example, and range from the coastal fog belt to the arid dry of the deserts. A zone map shows the following: Coastal Sonoma County—Petaluma-Sebastopol and the west as being region 1; Santa Rosa plain and Sonoma Valley as being region 5, and the northeast corner of the county as being region 8. Further, a published study by University of California called Water Use Classification of Landscape Species ("WUCOLS") specifies the "percentage of the Er" (the species or crop "factor") needed by all normally available landscape plants. Using the zone map showing the ET regions and the WUCOLS, the estimated quantity of water that is needed each month for any given plant type in a specified region may be calculated.

The California Irrigation Management Information System ("CIM IS") is a network of over 120 automated weather stations throughout the state. These stations provide data, such as temperature, humidity, wind, and evaporation, to central computers in Sacramento, which in turn provide daily ET° information about all 18 regions.

Since the plant type is known, according to conventional techniques, the crop factors for these plant types are multiplied by the ET° information to arrive at the amount of water needed, in a given month, by a particular type of plant. A few other factors also alter this equation, such as, and as will be explained below: the efficiency of the irrigation system (a drip irrigation system is conventionally measured at 90%); the planting density factor (e.g., total coverage, half coverage, sparse coverage); and a microclimate or exposure factor (e.g., whether zone is in sun, shade, windy area, exposed or protected).

Crop Factors (Coefficients): Crop coefficients, or species factors range from 0.1 to 0.9 and are divided into the following four categories: Very low<0.1 (10% of ET°); Low 0.1-0.3 (10%-30% of Er); Moderate 0.4-0.6 (40%-60% of ET°); and High 0.7-0.9 (70%-90% of ET°).

Planting Density Factor: The planting density factor ranges in value from 0.5 to 1.3. This range is separated into three categories: Low-Sparse coverage (0.5-0.9); Average-Moderate coverage (1.0); and High-Complete coverage (1.1-1.3).

Exposure Factor: The microclimate or exposure factor ranges from 0.5 to 1.4, and is divided into three categories: Low factor (0.5-0.9) for a protected, shady location; Average factor (1.0) for an open filed, low-moderate wind, and part sun; and High factor (1.1-1.4) for higher winds and greater exposure.

The conventional technique described herein finds the water requirement for plants by determining the ET° for a particular zone and month, applying to the determined ET° the crop or species coefficient for the plants involved, applying to the determined ET° the planting density factor, applying to the determined ET° the exposure factor, applying to the determined ET° the efficiency factor of the drip irrigation system (90%), and then converting the ET° inches per month to gallons per month. The conversion factor for converting inches of rain or water per acre (in which ET° is measured) to gallons of water is 0.623. (In other words, 0.623 represents the number of gallons per square foot associated with 1 acre-inch of water applied per acre [i.e., 27,154 gallons/43,560 square feet]. [Of note, 1 acre-inch of water equals 27,164 gallons of water.])

Thus, a conventional approach to finding the estimated amount of water required for plants in a given month for a particular type of plant may be expressed via the following Equation 1:

([ET° for zone and month×crop coefficient×planting density factor×exposure factor×planted area in square feet/drip irrigation efficiency factor [90%])×conversion factor [0.623]

In applying this conventional technique for finding water requirements for plants, consider an example, involving Zone 5 in July and a mix of forty drought tolerant and low water natives and Mediterranean plants (i.e., ceanothus, rhamnus californica, teucrium fruticans, achillea, prostrate rosemary, and euphorbia characias, spaced in a roughly 300 square foot area, wherein: the ET° for Zone 5 for July (found from a zone map provided at CIM IS) is 6.51 acres-inches; the crop coefficient factor is 0.2; the crop density factor is 1.0; the crop exposure factor is 0.9; (as noted) the planted area is 300 square feet; and the irrigation efficiency factor is 0.9. In this example, after applying the factors to Equation 1 (see below), it is found that the amount of water needed for the 300 square feet is 243 gallons per month (or about 60 gallons per week).

([6.51 acres-inch/month×0.2×1.0×300 Square Feet]/0.9)×0.623 gallons/square feet associated with acre-inch applied per acre=390.6 acres-inch for a square footage/month×0.623 gallons/square feet for acres-inch of water applied per acre=243 gallons of water/month for the 300 square foot area (or around 60 gallons per week for the 300 square foot area)

Thus, if plants with a higher crop coefficient were planted in the full sun, then the water requirements would increase substantially.

Conventional Step (2) Determine how many emitters to use and/or how much emitter line to use:

Based on the calculated estimate of the amount of water that is needed in a given planting area, conventional drip systems are designed to provide sufficient water to the planted area, while taking into account an already determined plant exposure and the soil type within the determined zone. In this example, assume that two ½ gph emitters (that are lower flow for denser soil) are applied to each plant (in this scenario, initially, while a single emitter works for a small plant, the single emitter does not allow for plant growth as well as even water spacing). Thus, with 40 plants, 80½ gph drippers will be applied, and each hour that the system is on, 40 gallons of water (a gallon per plant) will be supplied through the drip line to the area that includes the 40 plants. (Of note, if these 40 plants occupy one acre [instead of the 300 square feet as noted in the example], then the amount of water applied per irrigation cycle would be 40 gallons, or 40 gallons/(27,154 gallons/acre-inch)=0.00147 acre-inch water.)

Conventional Step (3) Determine the watering days and times necessary for desired plant growth and sustainability:

In the conventional technique for finding the water requirements for a crop, the information from the first two conventional steps above is combined to calculate a drip controller timing, such as when to turn water on, how frequently to turn water on, and how long to allow water to flow. In general, one of the biggest benefits of drip irrigation is that it releases small amounts of water, slowly, so that the water has a chance to penetrate. Drip irrigation enables the avoidance of water runoff and/or water overspray waste. However, and as noted herein, the plant selection and soil type affect the watering schedule. For example, some plants prefer to be continually damp, while other plants prefer to dry out between waterings.

Continuing with the above example, 240 gallons of water per month (or 60 gallons per week) for 40 plants spaced over 300 square feet is determined to be needed. The drip irrigation design provides forty gallons per hour. Since the planting zone (or section thereof) is in partial sun, waiting too long between waterings is determined to have ill effects. Further, since the soil is fairly dense, it is determined that the soil will retain some water. Thus a determination is made that the drip should run every six days, or roughly five times per month. (Conversely, it is determined that it is NOT desired to just water a tiny bit every day or water only once or twice per month.) It is determined that the drip should run for 75 minutes at a time, putting out about fifty (50) gallons per watering cycle, and about 250 gallons per month. However, if the soil were less dense and it was determined that the soil would not retain water for quite so long between cycles, the drip may be set to run every four days, seven times per month, for fifty minutes, at 245 gallons per month. Beyond the calculated estimates and the determinations made above, conventional techniques still require one to check to make sure that the plants are receiving the right amount of water by monitoring the drip line system, the plants' status and the soil.

If more or less water is needed at any given time, conventional controllers are enabled to override the current settings, allowing a set program to be increased or decreased by a certain percentage. A set program is by definition set at the 100% level, so that hot weather may be compensated for by overriding the setting and increasing the water delivery by, for example, 20-30%. Conversely, cool weather may be compensated for by overriding the setting and decreasing the water delivery by, for example, 80%.

Additionally, these weather-driven changes may be automated. The ET° information from the CIMIS system and the weather data is packaged by manufacturers of the "smart" irrigation controllers and transmitted to these irrigation controllers by radio signal. The smart controller makes the same calculations discussed above, integrates weather data down to a very small area (e.g., it knows if there is some rain in Glen Ellen, but not in Sonoma) and adjusts the water schedule on a daily basis, in accordance with conventional, though newer, technology.

Thus, conventional methods for determining emitter types and spacing along a drip line take into account a single soil type only within a large area of land encompassing the field to be watered, the climate, the expected weather, the plants' exposure to the elements and the expected plants' response to transpiration needs.

Additionally, and as described above, the conventional methods are dependent on conventional soil mapping techniques for determining the soil type for different plant regions. Conventional soil mapping techniques involve a description of a large area of land (e.g., the Santa Rosa Plain) having a singular soil type; in determining a soil type that is to be watered, conventional techniques for determining emitter types and spacing for a drip line do not consider a planting zone having varying soil types and layers of varying soil types.

Example Embodiments: Prescribing a Drip Line to be Used in a Field

Embodiments of the present technology determine a plant's watering needs by, in part, utilizing novel soil mapping techniques. This soil mapping technology provides soil conditions data that includes data relating to vertical transects of the soil within the field to be drip irrigated. This soil conditions data includes data relating to the soil type and the soil's physical (e.g., continuous soil vertical profile [in some embodiments, near-continuous soil vertical profile], including the depth and thickness of soil layers) and chemical properties. Embodiments enable the delineation of such soil conditions data in a two and/or three dimensional form. Thus, embodiments make use of a novel soil mapping technique that provides soil information for vertical transects of soil at a planting location, in order to determine the percolation rate of water through this vertical transect of soil. Flowing from the determination as to the percolation rate of water through the vertical transect, embodiments also determine how much water the vertical transects of soil can hold (a.k.a., "total water content" in the vertical transects of the soil; explained in further detail below) and the desired plant available water content that is accessible from the vertical transect of soil and by the plant.

Embodiments use the following information to determine what type of drip line emitter is needed (as per water flow capabilities) and/or the spacing on the drip line: 1) (near-continuous) vertical transect soil information; 2) information about the plants' demand for water over varying periods of time; 3) climate conditions data relating to the plant's location; and 4) the geographical conditions data (e.g., exposure to the elements, planted on slope) relating to the plants' location. Thus, embodiments enable a drip line to be designed that more efficiently waters plants, influences and encourages healthy plant growth, and saves a grower's resources (e.g., water, money, time, fertilizer, energy).

The discussion that follows describes FIGS. 1-4, while also providing a general overview of embodiments. As briefly stated above, the following discussion will begin by describing a drip line with emitters placed thereon, in accordance with conventional techniques (See FIG. 1.) The discussion then moves to a description of customized drip lines laid under, on or elevated above a ground's surface. The soil into which the plant is placed may be composed of different soil types layered on top of each other and along the length of the drip line, in accordance with embodiments.

Figure 2:
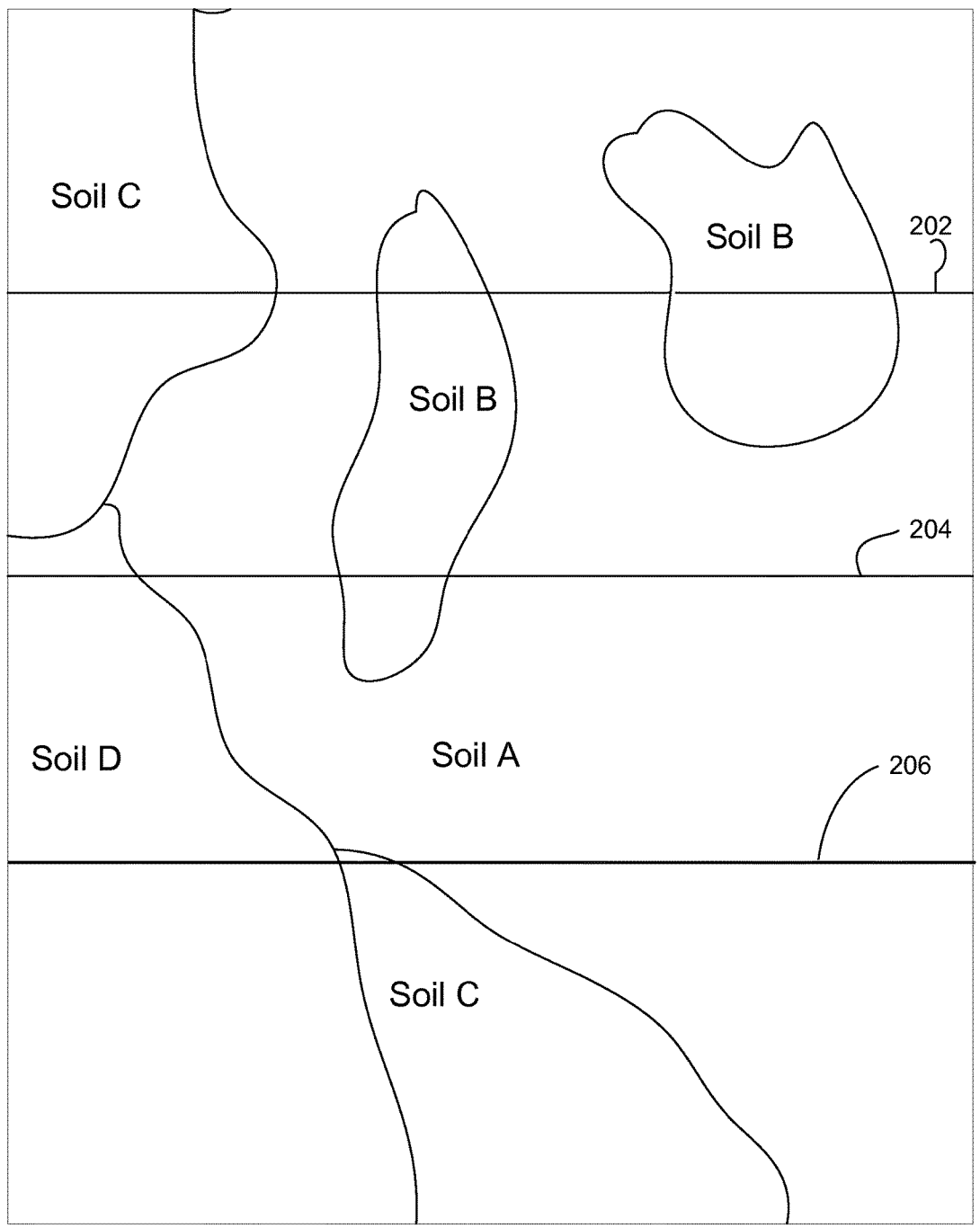
FIG. 2 shows a customized drip line overlaid onto the ground's surface and having there under different soil types along the length of each drip line, in accordance with an embodiment.

(See FIG. 2.) Following, the discussion turns to a description of a drip line elevated above a ground surface, the ground surface having thereunder, at some vertical transects, varying soil types, in accordance with embodiments. (See FIG. 3.) Finally, the discussion describes a drip line laid on top of the surface of the ground, demonstrating a root profile and a growth state of the plant, in accordance with embodiments. (See FIG. 4.)

FIG. 1 shows a drip line 100 having four emitters, 102, 104, 106 and 108, placed thereon, being uniformly spaced relative to each other, in accordance with conventional techniques. Emitter 102 is a distance 110 away from emitter 104. Emitter 104 is a distance 112 away from emitter 106. Emitter 106 is a distance 114 away from emitter 108. Every emitter has a flow rate of particular units/hour (determined at the factory). In conventional drip lines, emitters are spaced (uniformly) and have the same volumetric output at all locations (not variably spaced). The objective of the conventional system is to create a uniform column of wetted soil under the plants. As described, conventional techniques apply a flow rate, in part, based on the type of soil in which the plant is planted. Conventionally, the "type of soil" is determined through techniques known in the art for determining a soil type in a field to be irrigated. Typically, a field is determined to have a single type of soil, for which a drip line is customized.

In contrast to conventional techniques, embodiments determine the type of soil existing in a field to be irrigated by using soil conditions information that includes vertical transects data relating to at least one vertical transect taken within the field. The vertical transect may have multiple layers of different types of soil. Embodiments consider multi-layered soil conditions when determining the flow rate of water to be supplied to the soil via a drip line.

More particularly, embodiments of the present technology calculate the desired volume of water that will be accessible to a plant, of the total water content in the soil surrounding the plant's roots. While the total water refers to how much water the soil contains—once gravity removes water from the large cracks or pores (also known as filed capacity), plant available water content refers to how much water of the water that is being held by the soil is actually available to the plant roots. Of note, in some situations, the entirety of the water that is being held by the soil is not available to the plant (known as permanent wilting point). Further, the plant available water can be thought of as the difference between field capacity and a permanent wilting point. The amount of water readily available to a plant or crop (i.e., plant available water content) is typically some fraction of the total water content. In a scenario in which this fraction becomes smaller, it becomes more difficult for the plant to access the remaining water, and thus exemplifies the need for timely and appropriate irrigation. In one embodiment, the volume of water available to the plant (plant available water) is equal to the total water content. Embodiments also calculate the desired plant available water content at each soil transect based upon a determined vertical soil transect. The vertical soil transect may include several layers of different types of soil, wherein each type of soil or mixture of two soil types have varying consistencies and thicknesses. Therefore, each vertical soil transect has different holding capacities for water and thus, different plant available water contents.

FIG. 2 is an illustration of a customized drip line laid on the ground's surface having thereunder different soil types along the length of each drip line, in accordance with embodiments. Each customized drip line is unique to the vertical transect of soil types thereunder.

FIG. 2 shows four soil types, A, B, C, and D. Soil type A is clay. Soil type B is silt. Soil type C is sand. Soil type D is gravel. Also shown are custom drip lines 202, 204 and 206. FIG. 2 shows that soil changes occur in a continuous way along a drip line. For example, the custom drip line 202 moves over varying soil types, from left to right, depicting the following pattern: C, A, B, A, B, A. The custom drip line 204 moves over varying soil types, from left to right, depicting the following pattern: D, A, B, A. The custom drip line 206 moves over varying soil types, from left to right, depicting the following pattern: D, C, A. Since each drip line moves over varying soil types, each drip line may require different types of emitters for the different soil types. Additionally, the analysis of a lateral movement over varying soil types may also reveal vertical transects of soil having multiple layers of different types of soil.

In finding the vertical transect of soil types for different locations, the content of the soil's vertical transect information in a given plant area is surveyed through advanced soil mapping technology. For example, the following process is performed, using the Soil Information System™ (SIS) provided by C3, a division of Trimble, headquartered in Sunnyvale, Calif. The SIS provides a three dimensional database of field soil, obtaining over sixty physical and chemical characteristics. Actionable diagnostic reports are then generated from such a study.

Of note, since soil has been formed through millenniums through the interaction of topography, as well as through the weathering of rocks, minerals and organic matter, the resulting soil is hugely variable. The SIS provides accurate soil information to enable more precise farming. There are five steps to the SIS mapping process: 1) Define Field Boundary; 2) High resolution topographic and EM mapping (Surfing); 3) Soil characterization (Diving); 4) Soil chemical property characterization; and 5) Processing of input data through intelligent algorithms and database reference.

At step one, the boundary of the field is defined using a "surfer". A surfer is an ATV equipped with high resolution GPS, an electromagnetic (EM) sensor, and an on board computer that runs the SIS proprietary software. This software ties all parts of the mapping process together, from the targeting of optimal data collection locations to assisting field operators with in-field navigation, to transferring field collected data to an SIS office for data processing.

At step two, the surfer is used to fill in the detail within the perimeter defined in step one. The system is collecting variability information using the EM (which is the sled pulled behind the Surfer) and its corresponding position. Then surfer data is collected at a rate of approximately forty acres per hour. While this is occurring, the software is integrating the elevation to create what is called a digital elevation model. Information is being collected approximately every meter. Concurrently, the software at the SIS office is processing this information in preparation for the next step. The field's topography is displayed through a digital elevation model (DEM) and is useful in managing solar radiation availability and erosion potential. The SIS also collects electromagnetic conductivity data to provide the SIS with a better understanding of bulk soil variability and patterns. This information is used for step three.

At step three, that which creates the soil variability found in step two is investigated. This investigation process is called soil characterization, or diving. The diver (performing the diving) can be mounted on a number of different platforms. In one example, it is mounted on a tractor. It can also be mounted on a six wheeled gator or a track vehicle. The diver also has a survey grade GPS. It has a probe with different soil sensors that are pushed into the ground with a push system, as well as an on-board computer. The information from the surfer is sent to the diver. The software collects the locations on the field, which locations are targeted based upon the variability found in the step one. Continuing on, in step three, the diver software guides the operator to a particular point, for anchoring the system into the ground. This step will ensure that all measurements are repeatable. The geophysical probe is pushed into the ground (the push system is augured into the ground to provide stability and repeatability of measurements) to collect continuous data streams for tip force, sleeve friction, moisture, and electrical resistance. (A 100 acre field typically has thirty to one hundred probe sites, and each probe takes about one minute to perform.) The probe data that is streamed to the on-board computer captures continuous soil variability. Monitoring data signatures (using the on-board computer) while the data is being collected ensures data quality. The entire process of collecting data at each location takes approximately five minutes. All previously collected data is used as input for step four.

At step four, the chemical properties of the soil are characterized. The software processes all of the data collected from the surfer and the diver and selects locations, "X", "Y" and "Z" from the field in which cores will be taken to maximize the three dimensional presentation. (The on-board computer determines the optimal locations for chemical property core collection. The software helps to determine the ideal depths of subsampling to maximize a three dimensional spatial representation for chemical property analysis.) (All collected data is electronically sent from the field to an SIS processing center.)

At step five, all of the information is processed using algorithms and databases to interpret the data and create three dimensional maps. These three dimensional maps provide accurate soil information. For example, in a 120-acre field, the plant available water may vary by 100% horizontally and by 50% vertically. Over the root zone depth, the plant available water varies by 70%. The soil of a typical field has massive variation. The knowledge of plant available water influences irrigation layout, scheduling, moisture sensor targeting, rootstock selection and many other management decisions.

At a more general level, the process of sampling the soil for soil variability, and hence plant available water, in order to create high resolution three dimensional maps of a soil's type and thickness of soil layers is described as follows. Penetrometers are used to measure how much moisture is in the soil at the time of sampling. The use of the penetrometer not only determines the soil type and thickness of different soil layers, but it also determines the soil's chemical properties (and thus adsorption-how much positive charge a soil can hold). For example, the soil's chemical properties may include data indicating the extent of a soil's negative charge, if any. A soil's level of negative charge and the strength thereof affects the soils ability to hold fertilizer, thus affecting the plant's health and growth. For example, clay has more negatively charged particles than sand (which is slightly negatively charged). The higher the number of negative charges in a given volume of soil, the more fertilizer it can hold, since fertilizer is positively charged. Fertilizer typically includes positively charged elements, such as nitrogen, phosphorous and/or potassium. Thus, a foot of clay is more negatively charged than a foot of sand, and will hold more fertilizer than the sand will hold.

A penetrometer is inserted into the test subject (soil) or pressed against it and the depth of the resulting hole is measured. Enough core samplings are performed to overcome a statistical threshold required to determine (based on smart-sampling software which is part of the SIS) that a second location will likely have the same soil type and soil layer(s) found by a penetrometer performed at a first location, wherein the first location neighbors the second location.

Fertigation is the application of fertilizers, soil amendments or other water-soluble products through an irrigation process. Typically, during fertigation via a drip irrigation system, fertilizer is mixed with water and delivered to the plants. Additionally, sometimes fertigation is used to detach unwanted positively charged elements from the soil, like calcium, that have attached themselves to the negatively charged soil (e.g., clay). Of note, embodiments may also be used with chemigation. Chemigation is the application of chemicals through an irrigation process.

Figure 3:
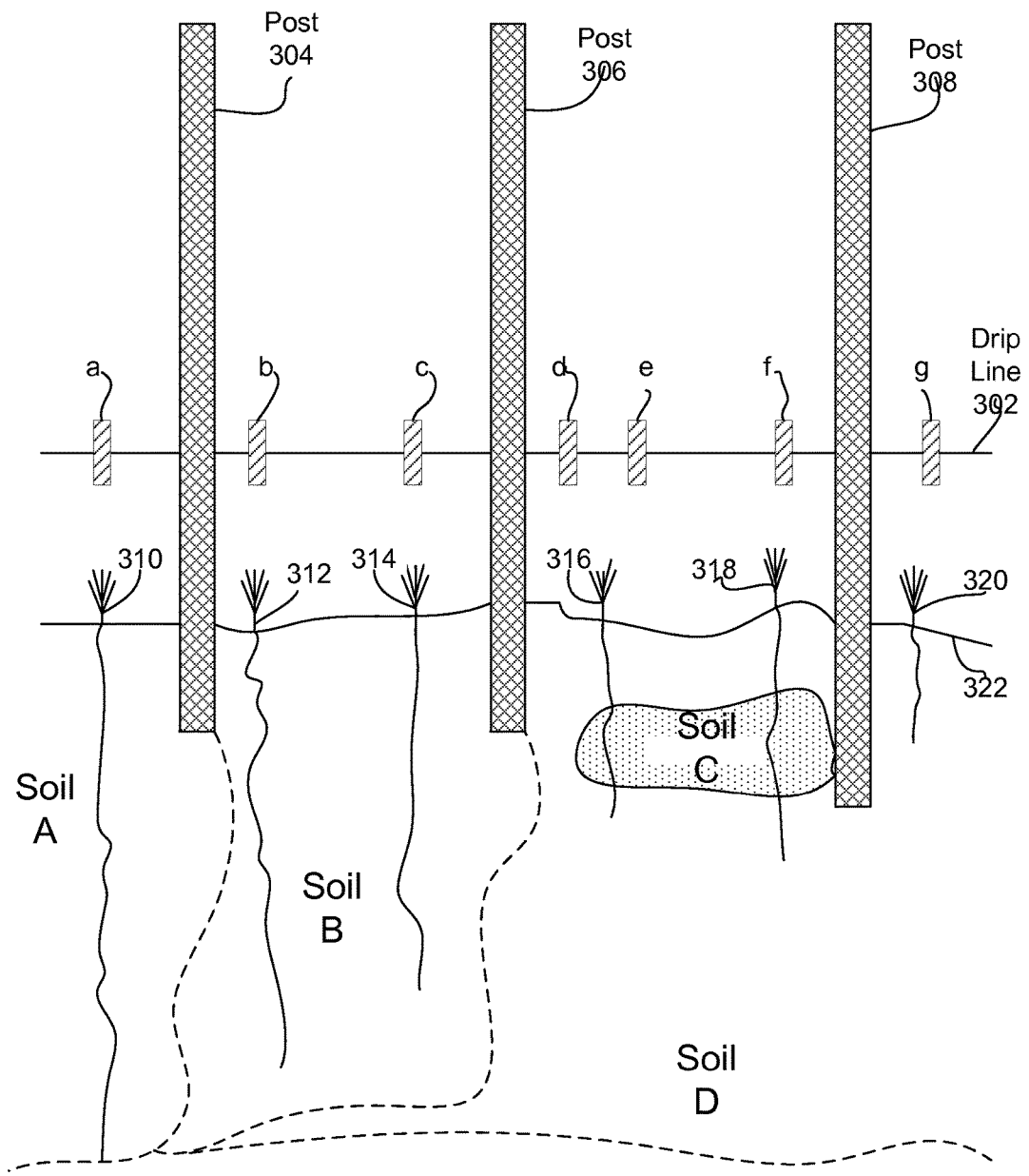
FIG. 3 shows a drip line elevated over the surface of the ground, demonstrating a root profile of a plant, a growth state of the plant, and a vertical transect of soil types at each plant location, in accordance with an embodiment.

FIG. 3 shows a drip line elevated above the surface of the ground 322, demonstrating a root profile of a plant, a growth state of the plant and a vertical transect of soil types at each plant location, in accordance with an embodiment. FIG. 3 shows the drip line 302 being strung along posts 304, 306 and 308. The drip line 302 has attached thereto emitters a, b, c, d, e, f and g. The emitters a, b, c, d, e, f and g vary in type and spacing as the soil changes along the drip line 302. The plants 310, 312, 314, 316, 318 and 320 are planted in the different soil types, A (clay), B (silt), C (sand) and D (gravel). As per the water holding capacity of the foregoing soil types, the following brief explanation is offered. Different soil types are able to hold different amounts of water for different periods of time. Take an example in which a certain amount of clay, silt, sand and gravel are each saturated with water and then placed in the air to let drain. Water eventually stops dripping from each soil type, which situation is defined as the amount of water held in the soil at field capacity. It will be seen that the water stops dripping from the gravel first, the sand second, the silt third and the clay last. This is because the gravel is packed together the least densely, while the clay is the most densely packed together. Further, it should be noted that at a saturation level (pre-field capacity), the gravel can initially hold the most water, while clay can initially hold the least amount of water. Thus, once all the water that will be drained from each soil type due to gravity drips out of the cracks and large pores, it will be found that the clay retains the most amount of water, while the gravel retains the least amount of water. Thus, when the pores of the soil types are not saturated and the water has someplace to go, either down or laterally, the gravel holds the least amount of water, while the clay holds the most amount of water. Thus, in a general sense, it is correct to state that clay has a higher water holding capacity than silt, silt has a higher water holding capacity than sand and sand has a higher water holding capacity than gravel.

Therefore, the soil type (and in some situations, layers of different soil types) is an integral factor in determining how much water should be applied to a planting area within such soil arrangement. Of further note, irrigation is generally not intentionally scheduled to be applied to soil that is already saturated with water.

As shown, the emitters a, b, c, d and e, f and g are spaced along the drip line 302 above the plants 310, 312, 314, 316, 318 and 320, respectively, according to a customized design. The roots of the plants 310, 312, 314, 316, 318 and 320 are shown to be of differing lengths within the various soil types.

In one example, as can be seen in FIG. 3, plant 316 is planted at an area that has layers of two different types of soil, C (sand) and D (gravel). Taking this information into account, embodiments determine that two emitters, d and e, are needed to be placed above the plant 316. As the plant 316 grows and the root reaches down below the soil C, it may be necessary to apply more water to the location at which the plant 316 is planted as compared to the location at which the plant 310 is planted. This is because the soil C (sand) holds more water than the soil A (clay). (As explained herein, in a general sense, the soil C [sand] holds more water than the soil A [clay], but this is a function of the type of soil and the thickness of the soil. A thick sand layer can hold more than a thin clay layer. Additionally, just because the soil holds more water, it does not mean that it is available to the plants as it might be held so tightly that the roots cannot access the water.)

Take the following example, if there was only one emitter "e" above the plant 316 and both the emitters "a" and "e" were the same, then the water flow though the soil C (sand) will be faster than the water flow through the soil A (clay). Therefore, water should be applied to the area surrounding plant 316 to create a larger wetted area, since water is moving through both the sand soil (Soil C) and the gravel soil (Soil D) at a faster rate than it moves through the clay soil (Soil A) such that the water being applied drains below the existing root zone and would therefore not be available to the plant. Thus, applying two emitters, "d" and "e" spaced apart above the plant 316, creates a larger wetted area, thereby encouraging root development in the zone where the current roots exist.

Of note, it should be appreciated, according to embodiments, that all plants in a given field, assuming that the plants have the same canopy and the same exposure, will have the same water requirements. The challenge is to deliver and hold that water that is delivered in the specific soil profile for each plant as soil variability occurs across that given field. Ultimately, in a field with uniform plants, the plant needs to access the same volume of water.

Of note, the determination of the type and spacing of the emitters on a drip line as described herein, in one embodiment, is performed at the manufacturer. The manufacturer places holes into the plastic tube and inserts the emitter(s), according to the placement determination made. In another embodiment, the manufacturer places the holes in the plastic tube but does not install the emitters. The customer receives the plastic tube separate from receiving the emitters. The customer places the emitters into the plastic tube to achieve a "drip line". In yet another embodiment, the customer receives the following: the plastic tube without the drilled holes and without the emitters placed therein; the emitters that are packaged separately from the plastic tube; and the instructions for drilling holes at specific locations and for placing the emitters within the drilled holes.

Figure 4:
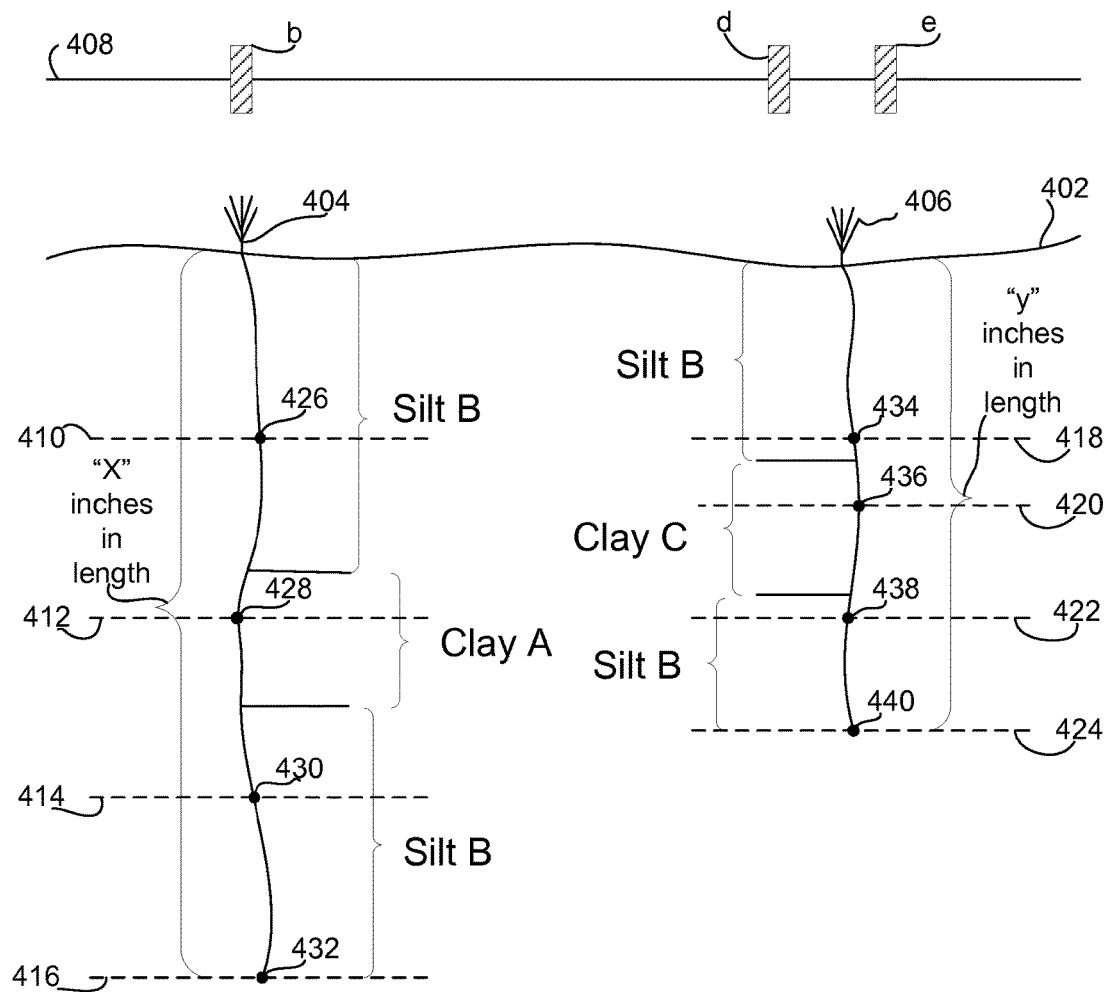
FIG. 4 shows a drip line laid over the ground's surface, demonstrating root profiles of the plant and a growth state of the plant, in accordance with an embodiment.

FIG. 4 illustrates a drip line laid over the ground's surface, demonstrating root profiles of the plant and a growth state of the plant, in accordance with an embodiment. As the growth stage of a plant and weather change, so too should the drip line prescription be varied. The drip line 408 shows emitters "b", "d" and "e" connected thereto. The plant 404 has a root profile that has grown to "x" inches in length through the following soil layers from top to bottom: B (silt); A (clay); and B (silt). The plant 406 has a root profile that has grown to "y" inches in length through the following soil layers from top to bottom: B (silt); C (sand); and B (silt). The time at which the plant root of plant 404 penetrates various depths of the soil is measured at lines 410, 412, 414 and 416. The time at which the plant root of the plant 406 penetrates various depths of the soil is measured at lines 418, 420, 422 and 424.

With regard to the plant 404, the area between the ground surface 402 and the line 410 represents the time between 0 and 4 weeks. The area between the line 410 and the line 412 represents the time between 4 and 7 weeks. The area between the line 412 and the line 414 represents the time between 7 and 12 weeks. The area between the line 414 and the line 416 represents the time between 12 and 16 weeks.

With regard to plant 406, the area between the ground surface 408 and the line 418 represents the time between 0 and 4 weeks. The area between the line 418 and the line 420 represents the time between 4 and 7 weeks. The area between the line 420 and the line 422 represents the time between 7 and 12 weeks. The area between the line 422 and the line 424 represents the time between 12 and 16 weeks.

Even though FIG. 4 shows an analysis of the growth of the plant's roots over a span of designated time periods (between 4, 7, 12 and 14 weeks), it should be appreciated that any amount of time may be measured with respect to the length of the plant root. In this example, the root of the plant 404 has reached a growth length of 12 inches having a depth "x". It took the plant 404 four weeks to grow three inches to reach point 426. It took the plant 404 three more weeks to grow an additional three inches to reach the point 428. It took the plant 404 five more weeks to grow an additional three inches to reach the point 430. It took the plant 404 two more weeks to grow an additional three inches to reach the point 432.

In contrast to plant 404, the plant 406 grew at a different rate than the plant 404. In this example, the root of the plant 406 has reached a growth length of 9½ inches. At four weeks after being planted, the root of the plant 406 measured three inches at point 434. At seven weeks, the root of the plant 406 measured four and one half inches at point 436. At 12 weeks, the root of the plant 406 measured seven inches at point 438. At 16 weeks, the root of the plant 406 measured nine and one half inches having a depth "y" at point 440. FIG. 4 demonstrates an example in which the plants 404 and 406 are different, grow at different rates, and grow through different combinations of soil types.

With regard to plant 404, embodiments enable the conservation of water. For example, at the four week mark, line 410, the root of the plant 404 has only reached three inches; it is unnecessary to provide water to the area under the planting location of plant 404 such that the water reaches a depth of nine inches below the soil. However, if the line 410 is near the permanent wilting point for the plant, and if there is never enough water applied to increase the water content of the soil below the line 410, no roots will be able to grow at this location. So, it is necessary, in some instances, to anticipate plant growth in order to provide water at a location below that which the plant root occupies, and to attempt to manage plant growth by applying enough water to encourage root growth beyond, for example, line 410 (at the four week mark).

Thus, knowing the plant growth rate and the soil through which it must grow enables embodiments to determine how much water to deliver, via the soil, to the plant throughout its life cycle.

The following non-limiting examples are factors that embodiments consider when determining how much water to deliver to a plant: root profile (root growth and root uptake); plant type (including the plant's canopy structure); exposure to the elements; climate; time of year; time of day; daily weather conditions; chemical content of soil (positively/negatively charged); content of the soil (types of soil); distribution of the type of soil (layers of different soil types); content of fertilizer desired to be applied; content of chemicals desired to be applied; desired plant growth; and the plant available water determination.

Of note, the canopy structure of the plant is the organization or spatial arrangement (3-D geometry) of the plant's canopy. In the context of embodiments, the plant's canopy is the extent of the outer layer of leaves of a plant. The leaf area index ("LAI") is the leaf area per unit of ground area covered by the plant's canopy.

As will be described below in detail, embodiments provide a drip line prescription that outlines a location and type of a set of emitters to be placed on the drip line such that the drip line is enabled to supply an amount of water at a particular flow rate over a particular period of time to the soil that meets the desired volume of water accessible (in the soil) to a plant that is needed by the plant for a desired growth. Thus, in embodiments, the drip line supplies a specific volume, "V", of water to the soil during a specific amount of time. To accomplish this, the set of emitters have a certain flow rate that enables the specific volume, "V", of water to enter the soil. The soil holds this water to a certain extent and also allows excess water to percolate through the soil at a certain quantity/hour. Embodiments calculate how much water is to be supplied to the vertical transect of soil, and subtracts how much water is anticipated to move through the vertical transect of the soil over a certain span of time and subtracts how much water that the vertical transect of soil is holding and not making available to the plant's roots. The difference is the quantity of plant available water content. When there are multiple layers of different soil types in a single vertical transect of the soil, then the rates at which the water moves through each soil type is weighed against each other to arrive at the average flow rate for the vertical transect and to determine how much anticipated water is to remain in the vertical transect. Further, the plant has a growth stage in which its root only reaches a certain depth of the vertical transect of soil. (Of note, while examples described herein concentrate on annual crops, it should be appreciated that embodiments also apply to perennial crops, despite its different root system.) Therefore, according to embodiments, the anticipated growth rate is a factor in determining which portion (e.g., layer) of the vertical transect of soil needs to have more or less water available to the plant's roots (plant available water content). In some instances, it is desirable for the plant's roots to always have accessible (or available) water. While in other instances, some plants desire a dry period between wet periods. Thus, embodiments determine the amount of water that it is desired for a plant root to have at a given point in time. Embodiments further determine the timing of the water delivery via the drip line. Then, embodiments determine the flow rate needed for delivery of water to the field, thereby also determining the type of emitter having a particular flow rating that is needed for water delivery.

Figure 6:
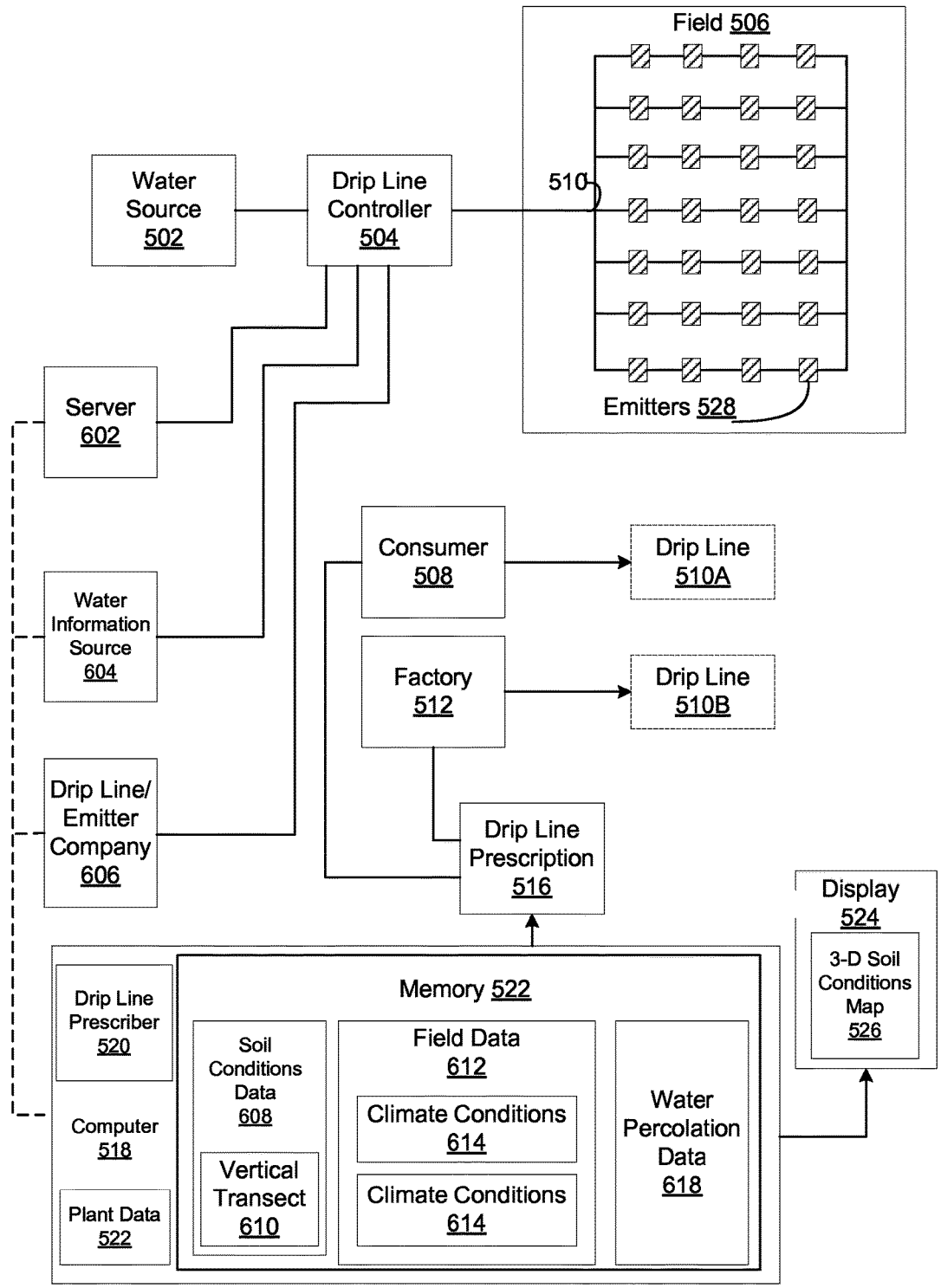

FIGS. 5 and 6 are block diagrams showing a high level view of the a drip line prescriber 520 implemented upon a computer 518 and functioning to provide a drip line prescription 516, in accordance with an embodiment. The drip line prescription 516 is used to build the drip line 510 that will be used for the field 506.

More particularly, FIG. 5 shows a computer 518 connected with a display 524. The drip line prescriber 520 resides at the computer 518. The drip line prescriber 520 functions to: analyze various factors affecting a volume of water available to the plant of the water that is being held by the soil in which the plant resides; and to generate a drip line prescription 516. The drip line prescription 516 describes a design of an optimal drip line for supplying water to the soil of the field 506 in which plants reside. The drip line prescription 516 describes the ideal placement of emitters 528 on the drip line and the ideal flow rate for each of the emitters 528 placed on the drip line such that the soil underneath the emitters 528 is able to retain enough water for the plants' needs over a known period of time. A factory 512 or the consumer 508 may use the drip line prescription 516 to build a drip line 510, such as the drip line 510A or drip line 510B, respectively. It should be appreciated and as will be described herein, that drip lines 510A and 510B, may be the same or different, depending on the drip line prescription 516.

The drip line 510 is shown attached to the drip line controller 504 and the water source 502. The drip line controller 504, in one embodiment, controls the application and timing of water supplied to the field 506 through the drip line 510. While the drip line controller 504 is shown to reside between the water source 502 and the drip line 510, it should be appreciated that the drip line controller 504 may be attached to the water source 502 only, and not connected to the drip line 510. However, in either scenario, the drip line controller 504 may control the ON/OFF status of the water being supplied to the field and from the water source 502.

FIG. 5 also shows the display 524 displaying a three dimensional soil conditions map 526. The three dimensional soil conditions map 526 shows a visual map of vertical soil transects in a specific area. It should be appreciated that the data underlying the 3-D soil conditions map resides at the memory storage 522 of the computer 518, in one embodiment. This map is a visual record of the soil conditions data; the drip line prescriber 520 accesses the soils conditions data in order to facilitate the generation of a drip line prescription 516.

The computer 518 is shown with the drip line prescriber 520 thereon (installed as an application or part thereof, in one embodiment) and the memory storage 522 (having optionally stored thereon at least data relating to plants and soil conditions data). While shown in FIG. 5 as being located at the computer 518 and coupled with the drip line prescriber 520, it should be appreciated that the memory storage 522 may be located elsewhere, such as at the drip line prescriber 520, in one embodiment.

The drip line prescriber 520 generates the drip line prescription 516, which details the type of emitters, the quantity of emitters and the location at which the emitters are to be placed for a particular tube to be used on a particular field for supplying water to a particular type of plant. In one embodiment, the factory 512 follows the drip line prescription 516 (specification details provided therein) to build the drip line 510B. In another embodiment, the consumer 508 follows the drip line prescription 516 to build the drip line 510A. It should be appreciated that the drip line prescription 516 may be specifically tailored for a factory's use or for a consumer's use. For example, the drip line prescription 516 may be drafted such that it is understandable by factory workers knowledgeable in building drip lines and installing emitters therein. However, for a consumer's use, the drip line prescription 516 may be drafted such that a consumer who is not an expert or knowledgeable in building drip lines may easily build a drip line to the specifications.

In one embodiment, the drip line 510 is part of a drip line system, which includes the drip line 510 and the drip line controller 504. The drip line controller 504 is attached to the water source 502 that initiates the water supply that moves through the drip line 510. The drip line controller 504, in one embodiment, controls the ON/OFF status of the water supply, and may be set to a timer. For example, in one embodiment, a timer at the drip line controller 504 is programmed to turn on every six hours for 30 minutes. Thus, every six hours, the drip line controller 504 causes an entry point to the drip line 510 to be opened, thereby enabling the water of the water supply to move through the drip line 510 and to the soil in the field. After 30 minutes, the drip line controller 504 causes the entry point to close, thus blocking the flow of water from the water supply. However, in another embodiment, the drip line controller 504 is coupled with the water source 502, and controls the ON/OFF status of the water flow.

For illustration purposes, the field 506 is shown with the drip line 510 laid thereon, and with a set of emitters 528 attached thereto. It should be appreciated that the set of emitters 528 includes one or more emitters, in accordance with embodiments. It should also be appreciated that the drip line 510 may be placed in any number of layouts according to various drip line prescriptions.

A display 524 is shown coupled with the computer 518. The display 524 enables a three dimensional soil conditions map 526 to be displayed thereon. The three dimensional soil conditions map 526 provides a visual display of the soil conditions, such as, but not limited to being, the following: soil type, soil quantity, soil location, and soil properties (e.g., chemical).

Referring now to FIG. 6, the computer 518 and/or the drip line controller 504, in various embodiments, is optionally coupled with any of the following: a server 602; a weather information source 604; and a company 606 that designs and/or makes drip lines and/or emitters. The computer 518 and/or the drip line controller 504 are enabled to receive communication from the server 602, weather information source 606 and/or the company 606 via radio signals. In one embodiment, the drip line prescriber 520 and/or the drip line controller 504 may use the data transmitted via the radio signals from the server 602, weather information source 606 and/or the company 606 to modify the drip line prescription 516 and/or the timing of the water being supplied to the field 506. In yet another embodiment, the operator (for example, a person managing the drip line) of the drip line 510 accesses (via retrieving and/or receiving information) the server 602, weather information source 604 and/or the company 606, and uses the information garnered therefrom to possibly modify the emitter type, quantity, and/or location(s) of the set of emitters on the drip line 510. In another embodiment, an entity (e.g., operator of the drip line, person managing the drip line, etc.) is scheduled to receive alerts if the drip line is to be modified in some way to adapt to changing weather patterns, new technology, etc. In one embodiment, the alerts include the modification information (such as, but not limited to, an updated drip line prescription or a portion thereof), while in another embodiment, the entity is alerted to the possibility of a modification and is urged to contact an appropriate information source.

In one embodiment, the memory storage 522 and/or the server 602 optionally includes any of the following (and as will be described herein): soil conditions data 608; field data 612; water percolation data 618; and plant data 620. In one embodiment, the soil conditions data 608 includes vertical transect data 610 relating to at least one vertical transect taken of the soil. In one embodiment, the field data 612 includes any of the following: climate conditions data 614; and geographical conditions data 616. The climate conditions data 614 is data that relates to the climate of the area in which the field is located. For example but not limited to such examples, climate conditions data 614 may describe the average temperature for a particular day of the year for the last ten years, the previous year's temperature on a particular day, real-time weather data, the average rainfall for a particular day of the year for the last fifteen years, and the previous year's amount of rainfall on a particular day.

The plant data, in various embodiments, includes, but is not limited to such, any data relating to the following: plant type; plant growth per type; plant growth per type in different weather conditions; plant growth per type in different types of soil; and water and/or plant food needed for plant growth by type, per weather conditions, per soil type.

The water percolation data 618, in various embodiments, includes data relating to the rate at which water percolates through different types of soil.

FIG. 7 is a block diagram of the drip line prescriber 520 of FIG. 5, in accordance with embodiments. With reference now to FIGS. 5-7, the drip line prescriber 520 is shown coupled with the computer 518. In one embodiment, the drip line prescriber 520 includes the following: a soil conditions data accessor 702; a desired plant available water content determiner 704; and an emitter placement determiner 710. In optional embodiments, the drip line prescriber 520 includes: a drip line prescription instructions generator 718; and a drip line prescription presenter 724.

The soil conditions data accessor accesses soil conditions data relating to the soil in a field, wherein the soil conditions data includes vertical transect data relating to at least one vertical transect of the soil. For example, the soil conditions data accessor 702 accesses soil conditions data 608 for soil in a field 506, wherein the soil conditions data includes vertical transect data 610 relating to at least one vertical transect taken of the soil.

The desired plant available water content determiner 704, based on a plant type 722 of at least one plant for planting in the field 506 and a length of time between a first watering and a second watering of the at least one plant via the drip line 510, determining a desired volume of water needed to be accessible by the plant and from the soil ("desired plant available water content"), wherein the desired volume of water is substantially achieved and delivered during the "first watering". In other words, the desired plant available water content determiner 704 determines a desired plant available water content of the at least one vertical transect of the soil, to be substantially achieved as a result of the first watering.

FIG. 8 shows a block diagram of a desired plant available water content determiner 704, in accordance with an embodiment. With reference now to FIGS. 5-8, the desired plant available water content determiner 704 will be discussed. According to embodiments, the desired plant available water content determiner 704 determines a desired plant available water content 712 of a portion of the soil to be substantially achieved as a result of the first watering. This determination is made based on the plant type data 722 relating to at least one plant for planting in the field 506 and a length of time between a first watering and a second watering of the at least one plant via a drip line. The term, "substantially" achieved, in reference to the desired plant available water content 712 of a portion of the soil being "substantially achieved" refers to the volume of water (determined to be the "desired plant available water content 712") within a vertical transect of the soil that is ultimately accessible by the plant is equal to the determined "desired plant available water" or close enough thereto such that the plant is able to achieve the desired growth after accessing the water. For example, it may be determined that the desired plant available water content 712 is five gallons. However, as a result of the first watering, only 4.8 gallons of the plant available water content are held by the vertical transect of the soil (or designated portion thereof). If it is predetermined that the threshold difference allowed between the desired plant available water content 712 and the actual plant available water content as a result of the first watering is 0.5 gallons, then it is determined that the desired plant available water content is substantially achieved, since 4.8 gallons is within the +0.5 gallons and −0.5 gallons difference threshold. In some embodiments, the threshold difference value is a factory set default value. While in other embodiments, the threshold difference value is programmed by one with access and authorization to program and/or reprogram the drip line prescriber 520.

In embodiments, the desired plant available water content determiner 704 includes: a plant data accessor 802; a watering data accessor 804; a comparer 806; and a desired plant available water content data generator 810.

The plant data accessor 802 accesses plant data 620 that includes plant type data 722. In other words, the plant data 620 includes data relating to the type of plant, wherein the data includes such things as, but not limited to, information about the following topics relating to the type of plant: the growth rate of the plant, how much water the plant needs for its minimum and maximum growth; growth rate in particular conditions, etc.

The watering data accessor 804 accesses watering data 708, wherein the watering data 708 includes a predetermined time of initiation for both a first watering and a second watering to occur and a length of time of the first watering. For example, a set of plants may be scheduled to be supplied water from the water source 502 at 6 a.m. This 6 a.m. watering is scheduled to last until 6:30 a.m. Then, the next time that the set of plants are scheduled to be supplied with water from the water source 502 is at 3 p.m. This 3 p.m. watering is scheduled to last until 3:30 p.m. Thus, the scheduled 6 a.m. to 6:30 a.m. watering refers to the "first watering", while the scheduled 3 p.m. to 3:30 p.m. watering refers to the "second watering". The "length of time" refers to the 30 minutes between 6 a.m. and 6:30 a.m. of the first watering.

Of note, if the next scheduled watering time is for 7 p.m. and is scheduled to last until 7:30 p.m., then in another embodiment, the "first watering" refers to the scheduled 3 p.m. to 3:30 p.m. watering and the "second watering" refers to the scheduled 7 p.m. to 7:30 p.m. watering, while the "length of time" refers to the 30 minutes between 3 p.m. and 3:30 p.m. of the first watering.

The comparer 806 compares the plant data 620, the watering data 708 and the soil conditions data 608 with a store 808 of plant available water content information 814. The plant available water content information 814 includes plant available water content needed, in the soil for the at least one plant, between waterings, by the plant(s). For example, the plant available water content information 814 describes how much water a plant needs between waterings (e.g., between the beginning of the first watering and the beginning of the second watering, between the end of the first watering and the beginning of the second watering), to account for a particular type of soil, during a particular time of the year, in order to grow at a desired rate, based on the type of the plant. Additionally, of note and as already discussed herein, while a particular desired plant available water content is determined for the vertical transect of soil in question, in many situations, not all of the water being held by the soil is actually accessible by the plant. Thus, when determining an amount of water to be delivered to the vertical transect of soil, embodiments take into account factors that cause less than the total amount of water delivered to the vertical transect of soil from actually being accessible to the plant. However, embodiments provide the determination of the plant available water necessary to be in the soil in which a plant is placed in order that the plant may access the water it needs for proper growth. The volume of water that is ultimately delivered to the vertical transect of soil may be more than the volume of water associated with the determined "desired plant available water", such that the plant is able to access the needed volume of water that is being held by the vertical transect of soil. In other words, embodiments understand how much water a certain vertical transect of soil is likely to hold or release to the plant. Thus, embodiments calculate the desired amount of water to be delivered to the vertical transect of soil that supports the plant's roots, while taking into account at least the following possible anticipated movement of any delivered volume of water: percolation of water vertically through and horizontally away from the vertical transect of soil; water that will be accessible to the plant within the vertical transect of soil; and/or water that is held by the vertical transect of soil, but that is inaccessible to the plant.

The desired plant available water content data generator 810 generates the desired plant available water content determination 712 for the plant for a particular plant type. The desired plant available water content determination 712, in one embodiment, is given in the form of a volume. In another embodiment, the desired plant available water content determination 712 is given in the form of a flow rate.

Of note, the store 808 of plant available water content information 814 may be located at the server 602, at the memory storage 522 of the computer 518 and/or at the drip line prescriber 702.

Of note and as already indicated herein, between the first watering and the second watering, many events may occur that decrease the plant available water content, other than through the plant transpiration. For example, heat may cause some of this water to dissipate and some of the water may run off due to slope conditions or soil conditions (evaporation). Additionally, even though a lot of water may be supplied from the water source 502, due to soil conditions, this water may percolate through the soil quickly, leaving little water left for the plant. (Of note, if the water moves through the soil quickly, it is because the soil has a high hydraulic conductivity and a lower water holding capacity. Additionally, the amount of water held by a volume of a particular type of soil [e.g., sand] at a first location will be the same as the amount of water held by the same volume of the same type of soil (sand) at a second location [different from the first location].) The factors that affect the plant available water content are addressed by embodiments and are described herein.

The emitter placement determiner 710 determines the perforation spacing 714 and the flow rate 716 for a set of emitters for the drip line 510 that will supply water during the first watering such that, along the drip line 510, the desired plant available water is substantially achieved in the portion of the soil within the at least one vertical transect of the soil. The emitter placement determiner 710 makes these determinations based on the vertical transect data 610 of the soil conditions data 608, the desired plant available water content determination 712, climate conditions data 614 for the field 506 and the geographical conditions 616 for the field 506.

The perforation spacing 714 is the spacing along the drip line for holes that are created and into which the set of emitters will be placed. These holes are created through drilling and/or punching with an object capable of creating such hole. For example, it may be determined that the perforation spacing should be at every foot along the drip line 510, as the plants over which the drip line 510 is to be placed, are also spaced at every foot. However, in another instance, it may be determined that a couple of the plants, due to the varying soils through which the roots of these plants are to grow, need two emitters placed over the plant and near to each other instead of one emitter placed over the plant.

As described herein, emitters typically are available that operate at different flow rates. It may be determined that of the thirty emitters to be placed in thirty perforations to be made in a drip line, ten of these emitters will be 2.0 liters/hour flow rate emitters, while twenty emitters will be 4.0 liters/hour flow rate emitters.

FIG. 9 shows a block diagram of an emitter placement determiner 710. With reference now to FIGS. 5-9, the emitter placement determiner 710 optionally includes any of the following: a water flow rate determiner 902; a water volume determiner 910; an emitter specification data accessor 928; a drip line specification data accessor 930; and a set of emitters determiner 920.

The water flow rate determiner 902 determines the water flow rate through the at least one vertical transect of the soil. The water flow rate is determined as to the flow rate of water over a particular vertical distance. In one example, suppose that the vertical transect of soil is made up of 50% clay and 50% silt, with the clay portion being closest to the ground's surface (shallow layer). In this example, the water flow rate determiner 902 determines the flow rate at which the water flows through various portions of the soil, both the clay and the silt. In various embodiments, the water flow rate determiner 902 optionally includes any of the following: a soil type comparer 906; and a water flow rate calculator 908.

The soil type comparer 906, in one embodiment, compares soil types data 904 of the vertical transect data 610 associated with the at least one vertical transect with water percolation data 618 corresponding to each type of soil of the soil types 904. The soil type data 904 includes information relating to soil types of the at least one vertical transect. The water percolation data 618 includes data for the soil types 904 relating to the rate that water is able to flow through soil types and combinations thereof. The water percolation data 628 resides in the memory storage 522, or in other types of accessible memory sources. In various embodiments, the memory storage 522 may be located at the water flow determiner 902, the drip line prescriber 520, the computer 518; and/or the server 602.

In one embodiment, the water percolation data 618 includes a water flow rate corresponding to each soil type of the soil types. For example, the water percolation data 618 may show that water flows through clay (a soil type) at an average of ½ gallon/hour. In another embodiment, the water percolation data 618 includes the water flow rate through a combination of two or more different types of the soil, of the soil types, which are layered on top of each other and within the vertical transect 610 of soil.

The water flow rate calculator 908, based on the comparing of the soil types data 904 performed by the soil type comparer 906, calculates the water flow rate through the vertical transect of soil. Continuing with the example describing the first half of the vertical transect of soil being clay (50% of the total soil and positioned closest to the ground surface) and the second half (50% of the total soil and positioned furthest from the ground surface) being silt, the water flow rate calculator 908 calculates that the water flow rate of the water through the clay will occur at an average rate of "X" gallons/hour, and the water flow rate through both the clay and the silt will occur at an average rate of "Y" gallons/hour.

In one embodiment, the emitter placement determiner 710 further includes: an emitter specification data accessor 928; a drip line specification data accessor 930; and a set of emitters determiner 920.

The emitter specification data accessor 928 accesses emitter specification data 932. The emitter specification data 932 is that data which explains the physical properties of the set of emitters, such as, but not limited to being, the following: an emitter's width; an emitter's height; an emitter's weight; an emitter's shape; the method for installing the emitter; an emitter type; new improvements to the emitter; an emitter's compatibility with other products; an emitter's flow rate; and an emitter's cost.

The drip line specification data 934 is that data that explains the physical properties of the tube for creating the drip line, such as, but not limited to being, the following: the length of the tube, the material(s) of which the tube is made; the thickness of the tube; and the cost of the tube.

The set of emitters determiner 920, based on the emitter specification data 932, the drip line specification data 934 and the determining the volume of water performed by the water volume determiner 910, makes a set of emitters determination 924 and a placement location 926 of the set of emitters determination on the drip line 510 that enable the volume of water to be supplied to the soil through the drip line 510 during a specified time period.

With reference again to FIG. 7, in one embodiment, the drip line prescriber 520 optionally includes the drip line prescription instructions generator 718. In one embodiment, the drip line prescription instructions generator 718 is coupled to the computer 518 and generates drip line prescription instructions. The drip line prescription instructions provide instructions to a user for placement of a set of emitters with the flow rate 716 at a location on the drip line, in accordance with determined perforation spacing 714.

With reference still to FIG. 7, in one embodiment, the drip line prescriber 520 optionally includes the drip line prescription presenter 724. The drip line prescription presenter 724 presents the drip line prescription 516 such that it may be visually displayed on, for example, the display 524 (or any other display screen for any type of device), or printed out on paper.

Example Method for Prescribing a Drip Line for Use in a Field

The following discussion sets forth in detail an example method of operation of embodiments. With reference to FIGS. 5-10, the flow diagram of method 1000 of FIG. 10 illustrates an example procedure used by various embodiments. Method 1000 includes some procedures that, in various embodiments, are carried out by a processor under the control of computer-readable and computer-executable instructions. In this fashion, procedures described herein and in conjunction with these flow diagrams, alone or in combination, are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, and optical disks, solid-state disks, any or all of which may be employed within a virtualization infrastructure. The computer-readable and computer-executable instructions, which reside on tangible computer readable storage media, are used to control or operate in conjunction with, for example, one or some combination of processors of a virtual machine. It is appreciated that the processor(s) may be physical or virtual or some combination (it should also be appreciated that a virtual processor is implemented on physical hardware). Although specific procedures are disclosed in method 1000, such procedures are examples. That is, embodiments are well suited to performing various other procedures or variations of the procedures recited in method 1000, alone or in combination. Likewise, in some embodiments, the procedures in method 1000, alone or in combination, may be performed in an order different than presented and/or not all of the procedures described in one or more of these flow diagrams may be performed. It is further appreciated that procedures described in method 1000, alone or in combination, may be implemented in hardware, or a combination of hardware with firmware and/or software.

FIG. 10 is a flow diagram of a method 1000 for performing a method for prescribing a drip line for use in a field, in accordance with an embodiment. Although specific procedures are disclosed in method 1000, embodiments are well suited to performing various other procedures or variations of the procedures recited in method 1000. It is appreciated that the procedures in method 1000 may be performed in an order different than presented, that not all of the procedures in method 1000 may be performed, and that additional procedures to those illustrated and described may be performed. All of, or a portion of, the procedures described by method 1000 can be implemented by a processor or computer system executing instructions which reside, for example, on computer-usable/readable media. The following discussion of method 1000 references FIGS. 5-10 unless specifically noted otherwise.

At step 1002 of method 1000, in one embodiment and as described herein, the soil conditions data 608 for soil in a field 506 is accessed, wherein the soil conditions data 608 includes vertical transect data 610 relating to the soil.

At step 1004 of method 1000, in one embodiment and as described herein, based on a plant type 722 of at least one plant for planting in the field 506 and a length of time between a first watering and a second watering of the at least one plant via the drip line 510, a desired plant available water content of a portion of the soil to be substantially achieved as a result of the first watering is determined.

At step 1006 of method 1000, in one embodiment and as described herein, based on the vertical transect data 610 of the soil conditions data 608, the desired plant available water content determination 712, climate conditions data 614 of the field 506 and geographical conditions 616 of the field 506, a drip line prescription 516 is determined, wherein the drip line prescription details the perforation spacing 714 and the flow rate 716 for a set of emitters for the drip line 510 that will supply water during the first watering is determined such that, along the drip line 510, the desired plant available water is substantially achieved in the portion of the soil within the at least one vertical transect. In one embodiment and as described herein, the determining at step 1006 includes: determining a water flow rate through the at least one vertical transect of the soil, wherein the determining the water flow rate includes: comparing soil type data 904 with water percolation data 618, wherein the soil type data 904 includes information relating to soil types of the at least one vertical transect; and based on the comparing, calculating the water flow rate through the at least one vertical transect of the soil. Based on the determining the water flow rate through the at least one vertical transect of the soil performed at step 1006, one embodiment determines a volume of water required to be supplied, during a time period, from a location on the drip line 510 and to the at least one vertical transect of the soil. Further, the determining the perforation spacing and flow rate for the set of emitters further includes, and as described herein: accessing emitter specification data 932; accessing the drip line specification data 934; and based on the emitter specification data 932, the drip line specification data 934 and the determining the volume of water, determining a set of emitters and a placement location of the set of emitters along the drip line 510 that enable the volume of water to be supplied to the soil through the drip line 510 during a specified time period.

In one embodiment, the determining the desired plant available water content of step 1004 further includes: accessing plant data 620 including: plant type data 722; accessing watering data 708 that includes a predetermined time of initiation for the first watering and the second watering and a length of the time of the first watering; comparing the plant data 620, the watering data 708 and the soil conditions data 608 with a store 808 of plant available water content information 814, wherein the plant available water content information 814 includes plant available water content needed in the soil for the at least one plant; and based on the comparing, generating the desired plant available water content (the desired plant available water content determination 712) for the at least one plant.

At step 1008 of method 1000, in one embodiment and as described herein, the drip line prescription instructions are generated, wherein the drip line prescription instructions provide instructions to a user for placement of a particular emitter with a particular flow rate at a location on the drip line 510 in accordance with determined perforation spacing.

At step 1010 of method 1000, in one embodiment and as described herein, the drip line prescription instructions are presented such that the drip line prescription instructions are enabled to be visually displayed. For example, the drip line prescription 516 may be displayed on a display, such as display 524 and/or it may be displayed as print on a piece of paper.

Example Computer System Environment

With reference now to FIG. 11, portions of the technology for providing a communication composed of non-transitory computer-readable and computer-executable instructions that reside, for example, in non-transitory computer-usable storage media of a computer system. That is, FIG. 11 illustrates one example of a type of computer that can be used to implement embodiments of the present technology. FIG. 11 represents a system or components that may be used in conjunction with aspects of the present technology. In one embodiment, some or all of the components of FIGS. 5-10 may be combined with some or all of the components of FIG. 11 to practice the present technology.

FIG. 11 illustrates an example computer system 1100 used in accordance with embodiments of the present technology. It is appreciated that system 1100 of FIG. 11 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 11, computer system 1100 of FIG. 11 is well adapted to having peripheral computer readable media 1102 such as, for example, a floppy disk, a compact disc, and the like coupled thereto.

System 1100 of FIG. 11 includes an address/data bus 1104 for communicating information, and a processor 1106A coupled to bus 1104 for processing information and instructions. As depicted in FIG. 11, system 1100 is also well suited to a multi-processor environment in which a plurality of processors 1106A, 1106B, and 1106C are present. Conversely, system 1100 is also well suited to having a single processor such as, for example, processor 1106A. Processors 1106A, 1106B, and 1106C may be any of various types of microprocessors. System 1100 also includes data storage features such as a computer usable volatile memory 1108, e.g., random access memory (RAM), coupled to bus 1104 for storing information and instructions for processors 1106A, 1106B, and 1106C.

System 1100 also includes computer usable non-volatile memory 1110, e.g., read only memory (ROM), coupled to bus 1104 for storing static information and instructions for processors 1106A, 1106B, and 1106C. Also present in system 1100 is a data storage unit 1112 (e.g., a magnetic or optical disk and disk drive) coupled to bus 1104 for storing information and instructions. System 1100 also includes an optional alpha-numeric input device 1114 including alpha-numeric and function keys coupled to bus 1104 for communicating information and command selections to processor 1106A or processors 1106A, 1106B, and 1106C. System 1100 also includes an optional cursor control device 1116 coupled to bus 1104 for communicating user input information and command selections to processor 1106A or processors 1106A, 1106B, and 1106C. System 1100 of the present embodiment also includes an optional display device 1118 coupled to bus 1104 for displaying information.

Referring still to FIG. 11, optional display device 1118 of FIG. 11 may be a liquid crystal device, cathode ray tube, plasma display device or other display device suitable for creating graphic images and alpha-numeric characters recognizable to a user. Optional cursor control device 1116 allows the computer user to dynamically signal the movement of a visible symbol (cursor) on a display of display device 1118. Many implementations of cursor control device 1116 are known in the art including a trackball, mouse, touch pad, joystick or special keys on alpha-numeric input device 1114 capable of signaling movement of a given direction or manner of displacement. Alternatively, it will be appreciated that a cursor can be directed and/or activated via input from alpha-numeric input device 1114 using special keys and key sequence commands.

System 1100 is also well suited to having a cursor directed by other means such as, for example, voice commands. System 1100 also includes an I/O device 1120 for coupling system 1100 with external entities. For example, in one embodiment, I/O device 1120 is a modem for enabling wired or wireless communications between system 1100 and an external network such as, but not limited to, the Internet. A more detailed discussion of the present technology is found below.

Referring still to FIG. 11, various other components are depicted for system 1100. Specifically, when present, an operating system 1122, applications 1124, modules 1126, and data 1128 are shown as typically residing in one or some combination of computer usable volatile memory 1108, e.g., random access memory (RAM), and data storage unit 1112. However, it is appreciated that in some embodiments, operating system 1122 may be stored in other locations such as on a network or on a flash drive; and that further, operating system 1122 may be accessed from a remote location via, for example, a coupling to the internet. In one embodiment, the present technology, for example, is stored as an application 1124 or module 1126 in memory locations within RAM 1108 and memory areas within data storage unit 1112. The present technology may be applied to one or more elements of described system 1100.

System 1100 also includes one or more signal generating and receiving device(s) 1130 coupled with bus 1104 for enabling system 1100 to interface with other electronic devices and computer systems. Signal generating and receiving device(s) 1130 of the present embodiment may include wired serial adaptors, modems, and network adaptors, wireless modems, and wireless network adaptors, and other such communication technology. The signal generating and receiving device(s) 1130 may work in conjunction with one or more communication interface(s) 1132 for coupling information to and/or from a drip line system (such as the drip line 510 in combination with the drip line controller 504). Communication interface 1132 may include a serial port, parallel port, Universal Serial Bus (USB), Ethernet port, antenna, or other input/output interface. Communication interface 1132 may physically, electrically, optically, or wirelessly (e.g., via radio frequency) couple system 1100 with another device, such as a cellular telephone, radio, or computer system.

The computing system 1100 is only one example of a suitable computing environment and is not intended to suggest any limitation as to the scope of use or functionality of the present technology. Neither should the computing environment 1100 be interpreted as having any dependency or requirement relating to any one or combination of components illustrated in the example computing system 1100.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for prescribing a drip line for use in a field, the method comprising:
    determining, using one or more processors, soil conditions data for soil in a field, wherein the soil conditions data comprises vertical transect data relating to at least one vertical transect of the soil, wherein a vertical transect provides information about one or more types and layers of soil below a surface of the field at a corresponding field location, and wherein determining the soil conditions data includes surveying the field by inserting a geophysical probe having one or more soil sensors below a surface of the field at a plurality of locations in the field to measure soil physical characteristics and soil chemical characteristics at a range of depths below the surface of the field;

determining, using the one or more processors, a plant type of at least one plant for planting in the field and a length of time between a first watering and a second watering of the at least one plant via a drip line;

determining, using the one or more processors, a desired plant available water content of a portion of the soil within the at least one vertical transect to be substantially achieved as a result of the first watering, wherein determining the desired plant available water content include using the plant type and the length of time between the first watering and the second watering;

determining, using the one or more processors, climate conditions data and geographical conditions data for the field; and determining, using the one or more processors, a perforation spacing and flow rate for a set of emitters for the drip line that will supply water during the first watering such that, along the drip line, the desired plant available water content is substantially achieved in the portion of the soil, wherein determining the perforation spacing and flow rate includes using the vertical transect data, the desired plant available water content, the climate conditions data, and the geographical conditions data.

2. The method of claim 1, wherein determining the perforation spacing and flow rate for the set of emitters comprises:

determining, using the one or more processors, a water flow rate through the at least one vertical transect of the soil, wherein determining the water flow rate comprises:

identifying, using the one or more processors, soil type data relating to soil types of the at least one vertical transect of the soil;

identifying, using the one or more processors, water percolation data corresponding to each type of soil of the soil types; and calculating, using the one or more processors, the water flow rate through the at least one vertical transect of the soil using the soil type data and the water percolation data.

3. The method of claim 2, wherein determining the perforation spacing and flow rate for the set of emitters further comprises:

determining, using the one or more processors, a volume of water required to be supplied, during a time period, from the drip line and to the at least one vertical transect of the soil such that the desired plant available water content is substantially achieved in the portion of the soil, wherein determining the volume of water includes using the water flow rate through the at least one vertical transect of the soil.

4. The method of claim 3, wherein determining the perforation spacing and flow rate for the set of emitters further comprises:

identifying, using the one or more processors, emitter specification data;

identifying, using the one or more processors, drip line specification data; and determining, using the one or more processors, one or more emitters and a placement location of the one or more emitters along the drip line that enable the volume of water to be supplied to the soil through the drip line during the time period, wherein determining the one or more emitters and the placement location of the one or more emitters includes using the emitter specification data, the drip line specification data and the volume of water required to be supplied.

5. The method of claim 1, further comprising:
generating, using the one or more processors, drip line prescription instructions, wherein the drip line prescription instructions correspond to instructions for placement of an emitter of the set of emitters with a corresponding flow rate at a corresponding location on the drip line according to the perforation spacing.

6. The method of claim 5, further comprising:
visually displaying, using the one or more processors, the drip line prescription instructions.

7. The method of claim 1, wherein determining the desired plant available water content comprises:

identifying plant data comprising plant type data relating to plant types;

identifying watering data comprising a predetermined time of initiation for the first watering and the second watering and a length of time of the first watering;

identifying plant available water content information; and generating the desired plant available water content needed in the soil for the at least one plant to access between waterings, wherein generating the desired plant available water content includes using the plant data, the watering data, and the plant available water content information.

8. A system for prescribing a drip line for use in a field, the system comprising:

one or more processors;

a non-transitory computer readable storage medium in data communication with the one or more processors, the non-transitory computer readable storage medium comprising instructions that, when executed by the one or more processors, cause the one or more processors to perform operations including:

obtaining soil conditions data for soil in a field, wherein the soil conditions data comprises vertical transect data relating to at least one vertical transect of the soil, wherein a vertical transect provides information about one or more types and layers of soil below a surface of the field at a corresponding field location, wherein the soil conditions data is determined by surveying the field by inserting a geophysical probe having one or more soil sensors below a surface of the field at a plurality of locations in the field to measure soil physical characteristics and soil chemical characteristics at a range of depths below the surface of the field;

determining a plant type of at least one plant for planting in the field and a length of time between a first watering and a second watering of the at least one plant via a drip line;

determining a desired plant available water content of a portion of the soil within the at least one vertical transect to be substantially achieved as a result of the first watering, wherein determining the desired plant available water content include using the plant type and the length of time between the first watering and the second watering;

determining climate conditions data and geographical conditions data for the field; and determining a perforation spacing and flow rate for a set of emitters for the drip line that will supply water during the first watering such that, along the drip line, the desired plant available water content is substantially achieved in the portion of the soil, wherein determining the perforation spacing and flow rate includes using the vertical transect data, the desired plant available water content, the climate conditions data, and the geographical conditions data.

9. The system of claim 8, wherein determining perforation spacing and flow rate for the set of emitters comprises:
determining a water flow rate through the at least one vertical transect of the soil, wherein determining the water flow rate comprises:
identifying soil type data relating to soil types of the at least one vertical transect of the soil;
identifying water percolation data corresponding to each type of soil of the soil types; and
calculating the water flow rate through the at least one vertical transect of the soil using the soil type data and the water percolation data.

10. The system of claim 9, wherein determining the perforation spacing and flow rate for the set of emitters further comprises:
determining a volume of water required to be supplied, during a time period, from the drip line and to the at least one vertical transect of the soil such that the desired plant available water content is substantially achieved in the portion of the soil, wherein determining the volume of water includes using the water flow rate through the at least one vertical transect of the soil.

11. The system of claim 10, wherein determining the perforation spacing and flow rate for the set of emitters further comprises:
identifying emitter specification data;
identifying drip line specification data; and
determining one or more emitters and a placement location of the one or more emitters along the drip line that enable the volume of water to be supplied to the soil through the drip line during the time period, wherein determining the one or more emitters and the placement location of the one or more emitters includes using the emitter specification data, the drip line specification data and the volume of water required to be supplied.

12. The system of claim 8, further comprising:
generating drip line prescription instructions, wherein the drip line prescription instructions correspond to instructions for placement of an emitter of the set of emitters with a corresponding flow rate at a corresponding location on the drip line according to the perforation spacing.

13. The system of claim 12, further comprising:
visually displaying the drip line prescription instructions.

14. The system of claim 8, wherein determining the desired plant available water content comprises:
identifying plant data comprising plant type data relating to plant types;
identifying watering data comprising a predetermined time of initiation for the first watering and the second watering and a length of time of the first watering;
identifying plant available water content information; and
generating the desired plant available water content needed in the soil for the at least one plant to access between waterings, wherein generating the desired plant available water content includes using the plant data, the watering data, and the plant available water content information.

15. A computer program product for prescribing a drip line for use in a field, the computer program product corresponding to a non-transitory computer readable storage medium comprising instructions that, when executed by one or more processors, cause the one or more processors to perform operations including:
obtaining soil conditions data for soil in a field, wherein the soil conditions data comprises vertical transect data relating to at least one vertical transect of the soil, wherein a vertical transect provides information about one or more types and layers of soil below a surface of the field at a corresponding field location, wherein the soil conditions data is determined by surveying the field by inserting a geophysical probe having one or more soil sensors below a surface of the field at a plurality of locations in the field to measure soil physical characteristics and soil chemical characteristics at a range of depths below the surface of the field;
determining a plant type of at least one plant for planting in the field and a length of time between a first watering and a second watering of the at least one plant via a drip line;
determining a desired plant available water content of a portion of the soil within the at least one vertical transect to be substantially achieved as a result of the first watering, wherein determining the desired plant available water content include using the plant type and the length of time between the first watering and the second watering;
determining climate conditions data and geographical conditions data for the field; and
determining a perforation spacing and flow rate for a set of emitters for the drip line that will supply water during the first watering such that, along the drip line, the desired plant available water content is substantially achieved in the portion of the soil, wherein determining the perforation spacing and flow rate includes using the vertical transect data, the desired plant available water content, the climate conditions data, and the geographical conditions data.

16. The computer program product of claim 15, wherein determining perforation spacing and flow rate for the set of emitters comprises:
determining a water flow rate through the at least one vertical transect of the soil, wherein determining the water flow rate comprises:
identifying soil type data relating to soil types of the at least one vertical transect of the soil;
identifying water percolation data corresponding to each type of soil of the soil types; and
calculating the water flow rate through the at least one vertical transect of the soil using the soil type data and the water percolation data.

17. The computer program product of claim 16, wherein determining the perforation spacing and flow rate for the set of emitters further comprises:
determining a volume of water required to be supplied, during a time period, from the drip line and to the at least one vertical transect of the soil such that the desired plant available water content is substantially achieved in the portion of the soil, wherein determining the volume of water includes using the water flow rate through the at least one vertical transect of the soil.

18. The computer program product of claim 17, wherein determining the perforation spacing and flow rate for the set of emitters further comprises:

identifying emitter specification data;

identifying drip line specification data; and determining one or more emitters and a placement location of the one or more emitters along the drip line that enable the volume of water to be supplied to the soil through the drip line during the time period, wherein determining the one or more emitters and the placement location of the one or more emitters includes using the emitter specification data, the drip line specification data and the volume of water required to be supplied.

19. The computer program product of claim 15, further comprising:

generating drip line prescription instructions, wherein the drip line prescription instructions correspond to instructions for placement of an emitter of the set of emitters with a corresponding flow rate at a corresponding location on the drip line according to the perforation spacing; and visually displaying the drip line prescription instructions.

20. The computer program product of claim 15, wherein determining the desired plant available water content comprises:

identifying plant data comprising plant type data relating to plant types;

identifying watering data comprising a predetermined time of initiation for the first watering and the second watering and a length of time of the first watering;

identifying plant available water content information; and generating the desired plant available water content needed in the soil for the at least one plant to access between waterings, wherein generating the desired plant available water content includes using the plant data, the watering data, and the plant available water content information.

* * * * *